United States Patent
Wiberg et al.

(10) Patent No.: US 11,297,529 B2
(45) Date of Patent: Apr. 5, 2022

(54) TOGGLING BASED INDICATOR OF RECEPTION SUCCESS

(71) Applicant: Telefonaktiebolaget LM Ericsson (publ), Stockholm (SE)

(72) Inventors: Niclas Wiberg, Linköping (SE); Erik Eriksson, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 198 days.

(21) Appl. No.: 15/776,966

(22) PCT Filed: Nov. 18, 2015

(86) PCT No.: PCT/EP2015/077006
§ 371 (c)(1),
(2) Date: May 17, 2018

(87) PCT Pub. No.: WO2017/084707
PCT Pub. Date: May 26, 2017

(65) Prior Publication Data
US 2018/0332500 A1    Nov. 15, 2018

(51) Int. Cl.
*H04W 28/04*    (2009.01)
*H04L 1/18*    (2006.01)
*H04L 1/16*    (2006.01)

(52) U.S. Cl.
CPC .......... *H04W 28/04* (2013.01); *H04L 1/1671* (2013.01); *H04L 1/1812* (2013.01); *H04L 1/1874* (2013.01); *H04L 1/188* (2013.01)

(58) Field of Classification Search
CPC ... H04L 1/1671; H04L 1/1812; H04L 1/1874; H04L 1/0002; H04L 1/0041; H04W 28/04
See application file for complete search history.

(56) References Cited

U.S. PATENT DOCUMENTS

2010/0296388 A1* 11/2010 Shimizu ................ H04L 1/0002
370/216
2011/0154170 A1* 6/2011 Challa ............... H03M 13/6525
714/807

(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.7.0, Sep. 2015, 1-77.

(Continued)

*Primary Examiner* — Anez C Ebrahim
(74) *Attorney, Agent, or Firm* — Sage Patent Group

(57) ABSTRACT

A radio device (100) sends a radio transmission (503, 507) to a further radio device (150). Further, the radio device (100) receives a further radio transmission (505, 509) from the further radio device (150). The further radio transmission (505, 509) comprises an indicator of reception success. In response to the indicator being toggled with respect to a previous state of the indicator, the radio device (100) determines that the radio transmission (509) was successfully received by the further radio device (150). In response to the indicator not being toggled with respect to the previous state of the indicator, the radio device (100) determines that the radio transmission (503) failed.

17 Claims, 16 Drawing Sheets

(56) References Cited

U.S. PATENT DOCUMENTS

| | | |
|---|---|---|
| 2011/0191647 A1 | 8/2011 | Miller |
| 2011/0286538 A1* | 11/2011 | Gunnarsson .......... H04L 1/1607 |
| | | 375/259 |
| 2014/0133391 A1 | 5/2014 | Djukic et al. |
| 2014/0254528 A1 | 9/2014 | Quan et al. |

OTHER PUBLICATIONS

3GPP, "3rd Generation Partnership Project; Technical Specification Group Radio Access Network; Evolved Universal Terrestrial Radio Access (E-UTRA); Radio Link Control (RLC) protocol specification (Release 12)", 3GPP TS 36.322 V12.3.0, Sep. 2015, 1-40.

* cited by examiner

TOGGLING BASED INDICATOR OF RECEPTION SUCCESS

TECHNICAL FIELD

The present invention relates to methods for controlling radio transmissions and to corresponding devices.

BACKGROUND

In communication networks, such as cellular radio networks based one the LTE (Long Term Evolution) radio technology or UMTS (Universal Mobile Telecommunications System) specified by 3GPP ($3^{rd}$ Generation Partnership Project), retransmissions may be utilized for improved reliability of radio transmissions. For example, such systems may provide an RLC (Radio Link Control) layer operating in an acknowledged mode (AM), in which an RLC sender, e.g., a base station, includes a sequence number in each sent data packet and an RLC receiver, e.g., a UE (user equipment), provides feedback packets to the RLC sender to indicate which data packets have been received or not. The RLC sender may then retransmit packets that have been lost.

In some cases a feedback packet is not necessary for the RLC sender to conclude that a packet has been lost. For example, this can occur if a further feedback mechanism is provided on a MAC (Medium Access Control) layer, arranged below the RLC layer. In the LTE and UMTS radio technology, such feedback mechanism is implemented on the basis of a HARQ (Hybrid Automatic Repeat Request) protocol. In such HARQ protocol, the base station, acting as a HARQ sender, may receive ACK (positive acknowledgement) feedback or NACK (negative acknowledgement) feedback from a the UE, acting as HARQ receiver, for each HARQ transmission attempt of a transport block (TB) by the base station. Several retransmissions may be attempted for a given TB, but in some cases the base station may choose to refrain from initiating further retransmission attempts and rather trigger a new transmission on the same HARQ process. In such cases, the MAC layer controlling the HARQ process could provide local feedback to the RLC layer to indicate that the transmission of the TB failed. The possibility of utilizing such local feedback is for example described in US 2014/0254528 A1.

However, the ACK/NACK feedback used in the HARQ protocols is not always reliable. For instance, the HARQ sender might misinterpret a NACK message as an ACK message. This may result in incorrect local feedback to the RLC layer.

Further, in some scenarios providing local feedback might not be possible because the HARQ sender does not get appropriate feedback from the HARQ receiver. For example, this may occur in the case of the uplink HARQ protocol of the in LTE radio technology, e.g., as specified in 3GPP TS 36.321 V12.7.0 (2015-09). Specifically, in this case a decision whether to perform an uplink HARQ retransmission may be made by the base station and signaled to the UE using an NDI (New Data Indicator) bit included in every uplink grant. The NDI bit is toggled if the UE shall perform a new transmission and kept unchanged if the UE shall perform a retransmission. However, a toggled NDI bit does not necessarily imply that a previously HARQ transmission of a TB was successfully received by the base station. For example, the base station may have decided to abandon this TB, e.g., due to an excessive number of HARQ retransmission attempts.

Accordingly, there is a need for techniques which allow for efficiently monitoring reception success of radio transmissions.

SUMMARY

According to an embodiment of the invention, a method is provided. According to the method, a radio device sends a radio transmission to a further radio device. Further, the radio device receives a further radio transmission from the further radio device. The further radio transmission comprises an indicator of reception success. In response to the indicator being toggled with respect to a previous state of the indicator, the radio device determines that the radio transmission was successfully received by the further radio device. In response to the indicator not being toggled with respect to the previous state of the indicator, the radio device determines that the radio transmission failed.

According to a further embodiment of the invention, a method is provided. According to the method, a radio device sets an indicator of reception success to one of a first state and a second state. Only in response to receiving the radio transmission from a further radio device, the radio device toggles the indicator to the other one of the first state and the second state. Further, the radio device sends a further radio transmission comprising the indicator to the further radio device.

According to a further embodiment of the invention, a radio device is provided. The radio device is configured to send a radio transmission to a further radio device. Further, the radio device is configured to receive a further radio transmission from the further radio device. The further radio transmission comprises an indicator of reception success. Further, the radio device is configured to, in response to the indicator being toggled with respect to a previous state of the indicator, determine that the radio transmission was successfully received by the further radio device. Further, the radio device is configured to, in response to the indicator not being toggled with respect to a previous state of the indicator, determine that the radio transmission failed. This configuration of the radio device may be achieved by providing the radio device with one or more processors and a memory storing corresponding program code to be executed by the processor(s).

According to a further embodiment of the invention, a radio device is provided. The radio device is configured to set an indicator of reception success to one of a first state and a second state. Further, the radio device is configured to, only in response to successfully receiving a radio transmission from a further radio device, toggle the indicator to the other one of the first state and the second state. Further, the radio device is configured to send a further radio transmission comprising the indicator to the further radio device. This configuration of the radio device may be achieved by providing the radio device with one or more processors and a memory storing corresponding program code to be executed by the processor(s).

According to a further embodiment of the invention, a computer program or computer program product is provided, e.g., in the form of a non-transitory storage medium, which comprises program code to be executed by at least one processor of a radio device. Execution of the program code causes the radio device send a radio transmission to a further radio device. Further, execution of the program code causes the radio device to receive a further radio transmission from the further radio device. The further radio transmission comprises an indicator of reception success. Further, execution of the program code causes the radio device to, in response to the indicator being toggled with respect to a previous state of the indicator, determine that the radio transmission was successfully received by the further radio device. Further, execution of the program code causes the radio device to, in response to the indicator not being toggled with respect to the previous state of the indicator, determine that the radio transmission failed.

Details of such embodiments and further embodiments will be apparent from the following detailed description of embodiments.

DETAILED DESCRIPTION OF EMBODIMENTS

Figure 1:
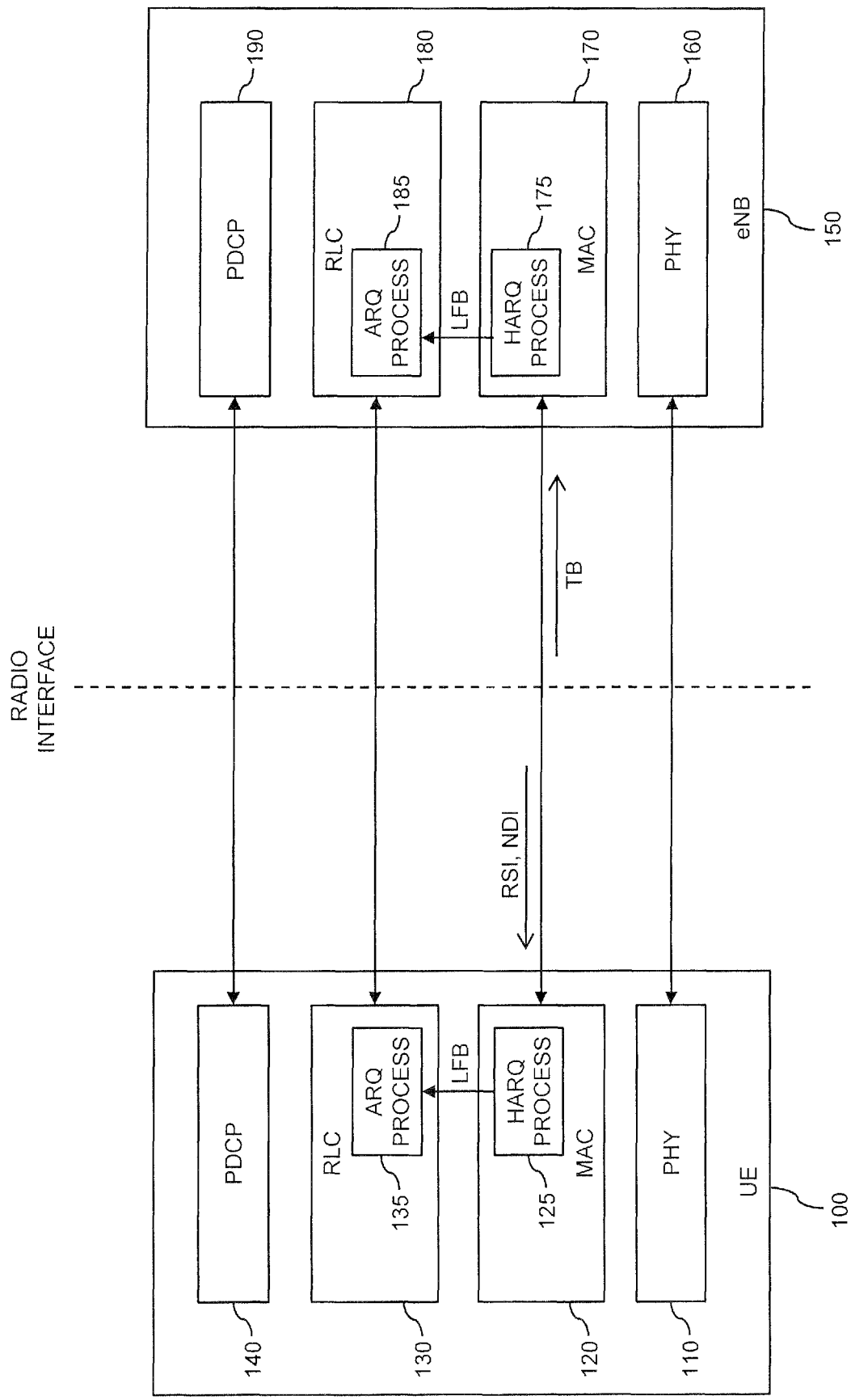
FIG. 1 schematically illustrates a radio system according to an embodiment of the invention.

In the following, concepts in accordance with exemplary embodiments of the invention will be explained in more detail and with reference to the accompanying drawings. The illustrated embodiments relate to control of radio transmissions in a communication network. In the examples as further illustrated below, it will be assumed that the communication network is a cellular radio network based on the LTE radio technology. However, it is to be understood that the illustrated concepts may also be applied in other kinds of communication networks, e.g., utilizing another cellular radio technology or a non-cellular radio technology.

In the illustrated concepts, a toggling based indicator is used for informing a first radio device which sent a radio transmission that the radio transmission was successfully received by a second radio device. The toggling based indicator can be toggled between a first state and a second state. The indicator, which for example may be represented by a single bit, is transmitted in a further radio transmission from the second radio device back to the first radio device. If the radio transmission was successfully received by the second radio device, the second radio device toggles the indicator with respect to a previous state of the indicator. Here, the previous state of the indicator typically means the state of the indicator as last transmitted to the first radio device. However, in some scenarios the previous state may also be a well-defined initial state, of which both the first radio device and the second radio device are aware. Accordingly, if the indicator is in the first state and the radio transmission is successfully received by the second radio device, the second radio device toggles the indicator from the first state to the second state. Similarly, if the indicator is in the second state and the radio transmission is successfully received by the second radio device, the second radio device toggles the indicator from the second state to the first state. Otherwise, the second radio device leaves the indicator unchanged, i.e., does not toggle the indicator. By encoding the information whether the radio transmission was successfully received or not in the toggling of the indicator, this information can be transmitted in a reliable manner. In the following, the indicator is also referred to as RSI (Reception Status Indicator).

The RSI may be utilized as feedback information in a HARQ process, e.g., in a HARQ process as defined in 3GPP TS 36.321 V12.7.0 (09-2015) for uplink radio transmissions from a UE to an LTE base station (referred to as eNB). As will be apparent from exemplary scenarios illustrated below, in such HARQ process the UE may use the RSI to reliably determine whether a TB transmitted in the uplink direction was successfully received by the eNB, while an NDI may be utilized in a conventional manner for triggering a HARQ retransmission of the TB. On the basis of the RSI, the UE may for example provide local feedback to a higher layer, e.g., to a RLC layer, where such local feedback information may for example be applied for controlling higher layer retransmissions and/or buffering of data for such higher layer retransmissions. This in turn may allow for organizing the higher layer retransmissions in a more resource efficient manner, e.g., by avoiding transmission of RLC packet acknowledgements from the eNB to the UE or avoiding transmission of data which was already successfully received.

When utilizing the RSI as feedback information in a HARQ process, the RSI may for example be transmitted in an uplink grant from the eNB to the UE, i.e., in downlink control information (DCI) transmitted on a PDCCH (Physical Downlink Control Channel). In such case, reliability of the information derived from the RSI may be further enhanced through the uplink grant (or DCI) being protected by a CRC (Cyclic Redundancy Check) code. However, it is to be understood that other messages or channels, with or without CRC protection, could be utilized as well for transmitting the RSI.

FIG. 1 schematically illustrates a protocol architecture as utilized in the UE 100 and the eNB 150 for performing radio transmissions across a radio interface. As illustrated, the UE 100 is provided with a PHY entity 110, a MAC entity 120, a RLC entity 130, and a PDCP entity 140. The PHY entity 110 is responsible for implementing physical layer functionalities of the UE 100. The MAC entity 120 is responsible for implementing MAC layer functionalities of the UE 100. As illustrated, such functionalities may include a HARQ process implemented by a HARQ entity 125 of the MAC entity 120. The RLC entity 130 is responsible for implementing RLC layer functionalities of the UE 100. As illustrated, such functionalities may include an ARQ (Automatic Repeat Request) process implemented by an ARQ entity 135. The PDCP entity 140 is responsible for implementing PDCP (Packet Data Convergence Protocol) functionalities of the UE 100. The eNB 150 provides a PHY entity 160, a MAC entity 170, a RLC entity 180, and a PDCP entity 190 for implementing corresponding functionalities. The PHY entity 160 is responsible for implementing physical layer functionalities of the eNB 150. The MAC entity 170 is responsible for implementing MAC layer functionalities of the eNB 150. As illustrated, such functionalities may include a HARQ process implemented by a HARQ entity 175 of the MAC entity 170. The RLC entity 180 is responsible for implementing RLC layer functionalities of the eNB 150. As illustrated, such functionalities may include an ARQ process implemented by a ARQ entity 185, e.g., based on ARQ functionalities as specified in 3GPP TS 36.322 V12.3.0 (2015-09). The PDCP entity 190 is responsible for implementing PDCP functionalities of the eNB 150. Accordingly, the example of FIG. 1 assumes a protocol stack including, starting from lower protocol layers, a PHY layer, a MAC layer, an RLC layer, and a PDCP layer. It is to be understood that while the protocol stack assumed in the example of FIG. 1 is consistent with typical scenarios of radio transmissions based on the LTE radio technology, other protocol stacks could be utilized as well, e.g., using additional protocol layers, fewer protocol layers or alternative protocol layers. Further, it is to be understood that for example multiple HARQ entities in the UE 100 and the eNB 150 could be provided for supporting multiple HARQ processes in parallel.

In the architecture of FIG. 1, the RSI may be transmitted in an uplink grant from the eNB 150 to the UE 100. Such an uplink grant would be transmitted on the PHY layer, in particular in DCI transmitted on the PDCCH. In addition to the RSI, the uplink grant also includes the NDI, which may be used by the HARQ process implemented by the UE 100 and the eNB 150 to control uplink retransmissions of TBs. As described in 3GPP TS 36.321 V 12.7.0, if for a given HARQ process the NDI transmitted in an uplink grant is not toggled as compared to the NDI transmitted in the previous uplink grant, the HARQ entity 125 of the UE 100 will trigger a retransmission of the TB transmitted on radio resources allocated by the previous uplink grant. Otherwise, if the NDI transmitted in the uplink grant is toggled as compared to the NDI transmitted in the previous uplink grant, the HARQ entity 125 of the UE 100 will proceed to a new transmission, e.g., of another TB. This may happen even if the TB was not successfully received by the eNB 150.

From the RSI, the UE 100 may derive whether the TB was successfully received by the eNB 150. Specifically, if the RSI transmitted in the uplink grant is not toggled as compared to the RSI transmitted in the previous uplink grant, the UE 100 may conclude that the TB was not (yet) successfully received by the eNB 150. If the RSI transmitted in the uplink grant is toggled as compared to the RSI transmitted in the previous uplink grant, the UE 100 may conclude that the TB was successfully received by the eNB 150. Such evaluation of the RSI may be accomplished by the MAC entity 120 of the UE 100.

The UE 100 may utilize the information derived from the RSI in various ways. For example, the MAC entity 120 may provide local feedback (LFB) to a higher protocol layer, in the example of FIG. 1 to the RLC layer. As illustrated, the HARQ entity 125 of the MAC layer may provide the local feedback to the ARQ entity 135 of the RLC layer. The ARQ entity 135 may utilize the local feedback for controlling ARQ retransmissions. For example, if the local feedback indicates that the TB was not successfully received, the ARQ entity 135 may trigger an ARQ retransmission of a certain protocol data unit (PDU) of the RLC layer. For example, the UE 100 may have attempted to transmit the TB in the course of an attempt to transmit this PDU, and failure of successfully transmitting the TB may be assumed to also result in failure of transmission of the PDU. Further, the local feedback may be utilized for controlling buffering of data for ARQ retransmissions. For example, if the RSI indicates that the TB was successfully received by the eNB 150, the ARQ entity 135 may remove previously buffered data corresponding to the TB since it will not have to be retransmitted. As further illustrated, local feedback may also be utilized at the eNB 150. For example, after verifying that the TB was successfully received, the HARQ entity 175 of the eNB 150 may provide corresponding local feedback to the ARQ entity 185 of the eNB 150.

Figure 2:
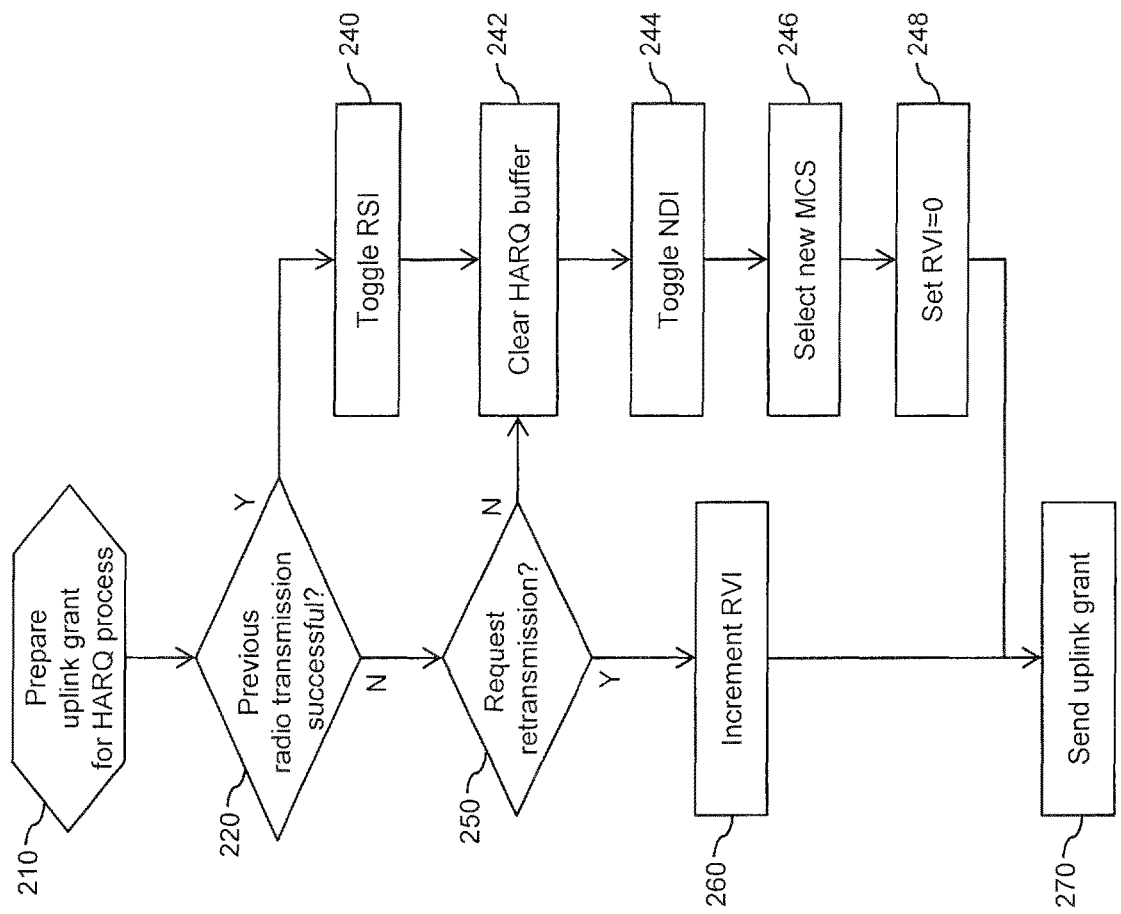
FIG. 2 shows the flowchart for illustrating a method according to an embodiment of the invention, which may be implemented by a base station of a cellular radio network.

FIG. 2 shows a flowchart for illustrating processes which may be performed by the eNB 150 to implement the concepts as outlined above.

At 210, the eNB 150 starts preparation of an uplink grant for a HARQ process. The uplink grant may for example be prepared in response to a scheduling request from the UE 100 or in response to a buffer status report (BSR) sent by the UE 100. The uplink grant allocates uplink radio resources to the UE 100, e.g., radio resources of a PUSCH (Physical Uplink Shared Channel).

At 220, the eNB 150 checks if the previous radio transmission from the UE 100 was successfully received by the eNB 150. Here, the radio transmission may be regarded as being successfully received if the PHY entity 160 of the eNB 150 was able to decode the TB transmitted in the previous radio transmission, either in a first attempt based on the previous radio transmission alone or, if the previous radio transmission constitutes a retransmission, further considering earlier transmission attempts of the TB. If the previous radio transmission was successful, the eNB 150 proceeds to 240, as indicated by branch "Y".

At 240, the eNB 150 toggles the RSI. As mentioned above, the RSI may be represented by a single bit. Accordingly, the toggling may either involve changing the bit representing the RSI from "0" to "1" or changing the bit representing the RSI from "1" to "0", depending on whether the previous state was "0" or "1". For this purpose, the eNB 150 may store the state of the RSI for this HARQ process and thus be aware of the state of the RSI as last indicated to the UE 100 in this HARQ process.

The eNB 150 then proceeds to 242 where a HARQ buffer for the HARQ process is cleared. The HARQ buffer is provided for storing undecoded data from previous transmission attempts in this HARQ process, so that these data can be utilized for decoding attempts based on the initial radio transmission of a TB and one or more retransmissions of the TB.

At 244, the eNB 150 then toggles the NDI. Similar to the RSI, the toggling of the NDI may either involve changing the bit representing the NDI from "0" to "1" or changing the bit representing the NDI from "1" to "0", depending on whether the previous state was "0" or "1". For this purpose, the eNB 150 may store the state of the NDI for this HARQ process and thus be aware of the state of the NDI as last indicated to the UE 100 in this HARQ process. By toggling the NDI, the eNB 150 indicates that the UE 100 shall proceed to a new radio transmission, rather than performing a retransmission of the previously transmitted TB.

At 246, the eNB 150 may then select a new modulation and coding scheme (MCS) to be used in future radio transmissions from the UE 100. At 248, the eNB 150 sets a Redundancy Version Index (RVI) of this HARQ process to 0. As described in 3GPP TS 36.321, the RVI is incremented it by one with each attempted transmission/retransmission and, if a new radio transmission is initiated, reset to zero. The eNB 150 then proceeds to 270 to send the prepared uplink grant.

If at 220, the previous radio transmission is found to be not successfully received, i.e., failed, the eNB 150 proceeds to 250, as indicated by branch "N". At 250, the eNB 150 decides whether the UE 100 shall perform a retransmission of the failed radio transmission. The decision at 250 may for example be based on a number of attempted transmissions/retransmissions of the TB. If the number of attempted transmissions/retransmissions is low, i.e., below a threshold, the eNB 150 may decide to initiate a retransmission of the TB and proceed to 260, as indicated by branch "Y". If the number of attempted transmissions/retransmissions is high, i.e., above a threshold, the eNB 150 may decide to refrain from further retransmission attempts and proceed to 242 in order to initiate a new radio transmission in this HARQ process. At 260, the eNB 150 increments the RVI and then proceeds to 270 to send the prepared uplink grant.

At 270, the eNB 150 sends the prepared uplink grant. This is accomplished on the PDCCH. The prepared uplink grant includes HARQ information for the HARQ process and to be utilized by the HARQ entity 125 of the UE 100 to control retransmissions and to determine whether the previous radio transmission of the TB was successful. The HARQ information specifically includes the RSI, the NDI, and the RVI. The HARQ information does not include a HARQ feedback such as a HARQ ACK or NACK sent on PHICH. The uplink grant as transmitted is CRC protected, thereby minimizing a risk of providing faulty or compromised HARQ information to the UE 100.

The processes as explained in connection with 220, 240, 244, 246, 248, 250, and 260 may be performed on the MAC layer, e.g., by the HARQ entity 175 of the eNB 150.

Figure 3:
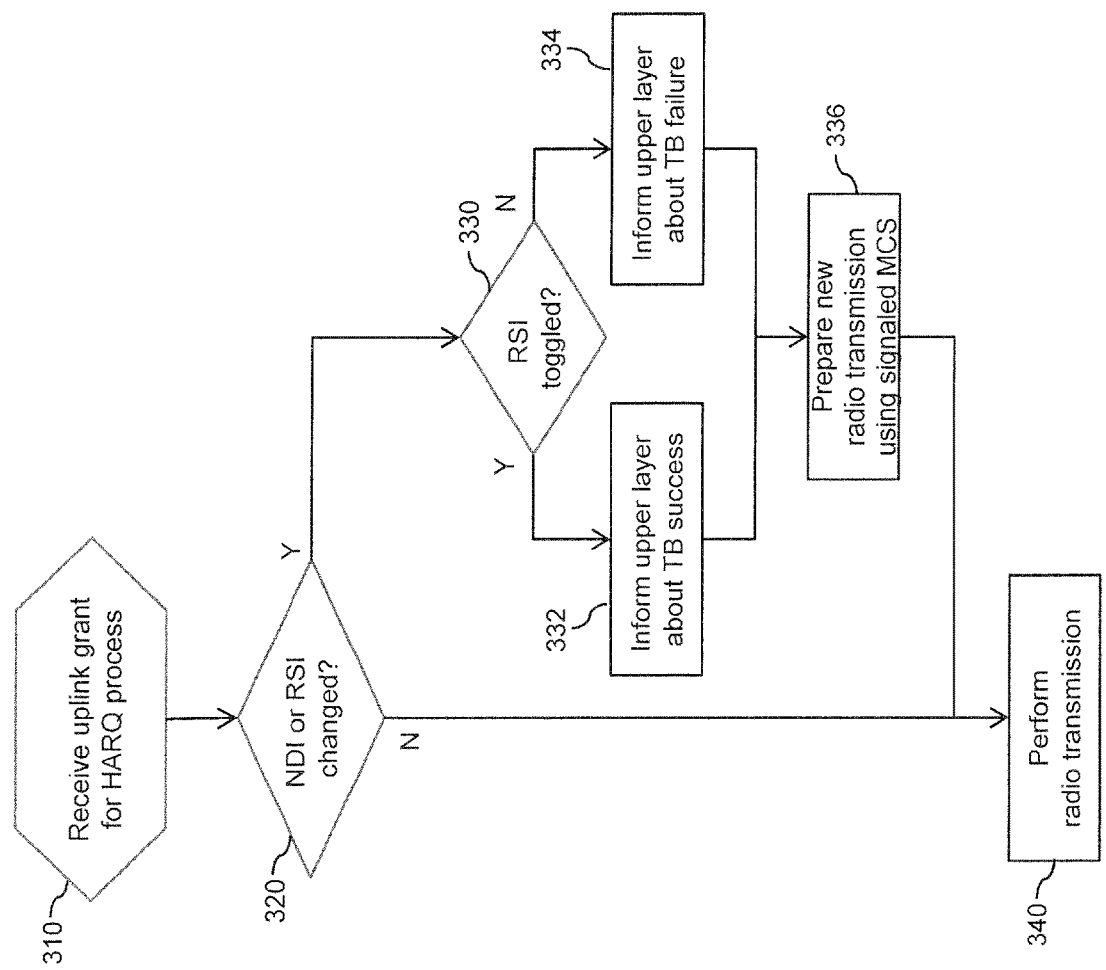
FIG. 3 shows a flowchart for illustrating a method according to an embodiment of the invention, which may be implemented by a UE connected to a cellular radio network.

FIG. 3 shows a flowchart for illustrating processes which may performed by the UE 100 to implement the concepts as outlined above.

At 310, the UE 100 receives an uplink grant for the HARQ process. The UE 100 receives a uplink grant on the PDCCH. The uplink grant may for example be received in response to a scheduling request or BSR sent by the UE 100. The uplink grant allocates uplink radio resources to the UE 100, e.g., radio resources of the PUSCH. The uplink grant may for example correspond to the uplink grant as transmitted in the processes of FIG. 2 at 270. The received uplink grant includes HARQ information for the HARQ process, in particular the RSI, the NDI, and the RVI. The uplink grant is assumed to be CRC protected, and receiving the uplink grant may thus involve a CRC verification that the received uplink grant is not compromised. If search CRC verification reveals that the received uplink grant is compromised, the received uplink grant is discarded by the UE 100.

At 320, the UE 100 checks if the NDI or RSI was changed as compared to the NDI or RSI indicated in the last uplink grant received for this HARQ process. If this is the case, the UE 100 proceeds to 330, as indicated by branch "Y". If this is not the case, the UE proceeds to 340, as indicated by branch "N".

At 330, the UE 100 checks if the RSI indicated in the received uplink grant is toggled with respect to the state of the RSI indicated in the last received uplink grant for this HARQ process. If this is the case, the UE 100 proceeds to 332, where the UE 100 informs an upper layer, e.g., the RLC layer, that the previously transmitted TB, in particular the TB transmitted on the uplink radio resources allocated by the last uplink grant received for this HARQ process, was successfully received by the eNB 150. This may be regarded as providing a local positive acknowledgement (local ACK) to the higher layer. If the check of 330 reveals that the RSI indicated in the received uplink grant is not toggled with respect to the state of the RSI indicated in the last received uplink grant for this HARQ process, i.e., that the RSI is left unchanged, the UE 100 proceeds to 334, where the UE 100 informs the upper layer that the transmission of the TB failed. This may be regarded as providing a local negative acknowledgement (local NACK) to the higher layer.

After informing the upper layer at 332 or 334, the UE 100 then prepares a new radio transmission. This is accomplished based on the MCS indicated in the uplink grant, which may be changed as compared to previous radio transmissions or may be left unchanged. The new radio transmission may be prepared with a new TB. However, in some cases the new radio transmission may also be prepared with the same TB of the previous transmission attempt, however utilizing a different MCS, as signaled in the received uplink grant. The UE 100 then proceeds to 340 to perform the radio transmission on the uplink radio resources allocated by the received uplink grant.

At 340, the UE 100 performs the radio transmission on the uplink radio resources allocated by the received uplink grant. If the check of 320 revealed that none of the NDI or RSI was changed, the radio transmission is performed as a retransmission of the previous transmission/retransmission attempt in this HARQ process. In the event that this UL grant corresponds to the first UL grant received by the UE, a first radio transmission which is not a retransmission is sent. In any of these cases, informing the upper layer, e.g. the RLC layer, by means of local feedback may be performed or might not be performed. Else, if the branch "Y" is followed at the determination 320, the radio transmission performed at 340 corresponds to the new radio transmission prepared at 336. In any case, the radio transmission is performed using the redundancy version identified by the RVI in the received uplink grant.

The processes as explained in connection with 320, 330, 332, 334, and 336 may be performed on the MAC layer, e.g., by the HARQ entity 175 of the eNB 150.

In the following, exemplary scenarios showing how the RSI may be utilized will be explained by referring to examples of processes as illustrated in FIGS. 4 to 10. In each case, these processes involve the UE 100 and the eNB 150.

Figure 4:
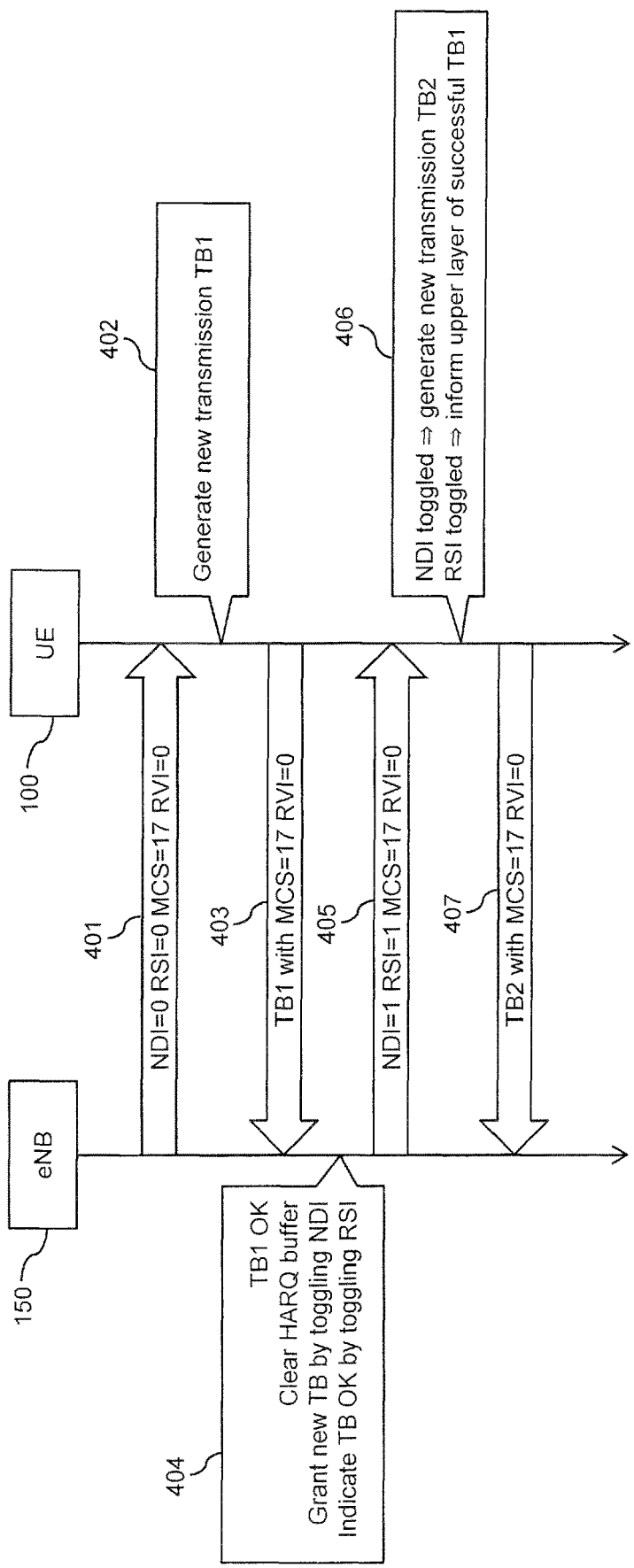
FIG. 4 shows a signal flow diagram for illustrating processes in an exemplary scenario according to an embodiment of the invention.

The scenario of FIG. 4 involves an initially successful transmission of a TB. In this scenario, the eNB 150 sends a first uplink grant 401 to the UE 100. As illustrated, the first uplink grant 401 includes the NDI with status "0", the RSI with status "0", an MCS index with value "17", and an RVI with value "0".

As illustrated by step 402, in response to receiving the first uplink grant 401 the UE 100 generates a new radio transmission of a first TB (TB1). The UE 100 then performs the radio transmission 403 of the first TB, using the MCS identified by MCS index 17 and the redundancy version identified by RVI 0.

As illustrated by step 404, upon receiving the radio transmission 403 of the first TB, the eNB 150 verifies that the first TB was successfully received, clears the HARQ buffer, grants transmission of a new TB by toggling the NDI from status "0" to "1", and resets the RVI to "0". Further, the eNB 150 toggles the RSI from status "0" to "1" to indicate to the UE 100 that the first TB was successfully received by the eNB 150.

The eNB 150 then sends a second uplink grant 405 to the UE 100. As illustrated, the second uplink grant 405 includes the toggled NDI (now status "1") and the toggled RSI (now status "1"). Further, the further uplink grant 405 includes an MCS index with value "17", and an RVI with value "0".

As illustrated by step 406, in response to receiving the second uplink grant 405, the UE 100 detects that the NDI was toggled as compared to the NDI in the first uplink grant 401 and therefore generates a new radio transmission of a second TB (TB2). Further, the UE 100 detects that RSI was toggled as compared to the RSI in the first uplink grant 401 and therefore informs the higher layer, e.g., the RLC layer, that the first TB was successfully received. The UE 100 then performs the radio transmission 407 of the second TB, using the MCS identified by MCS index 17 and the redundancy version identified by RVI 0.

Figure 5:
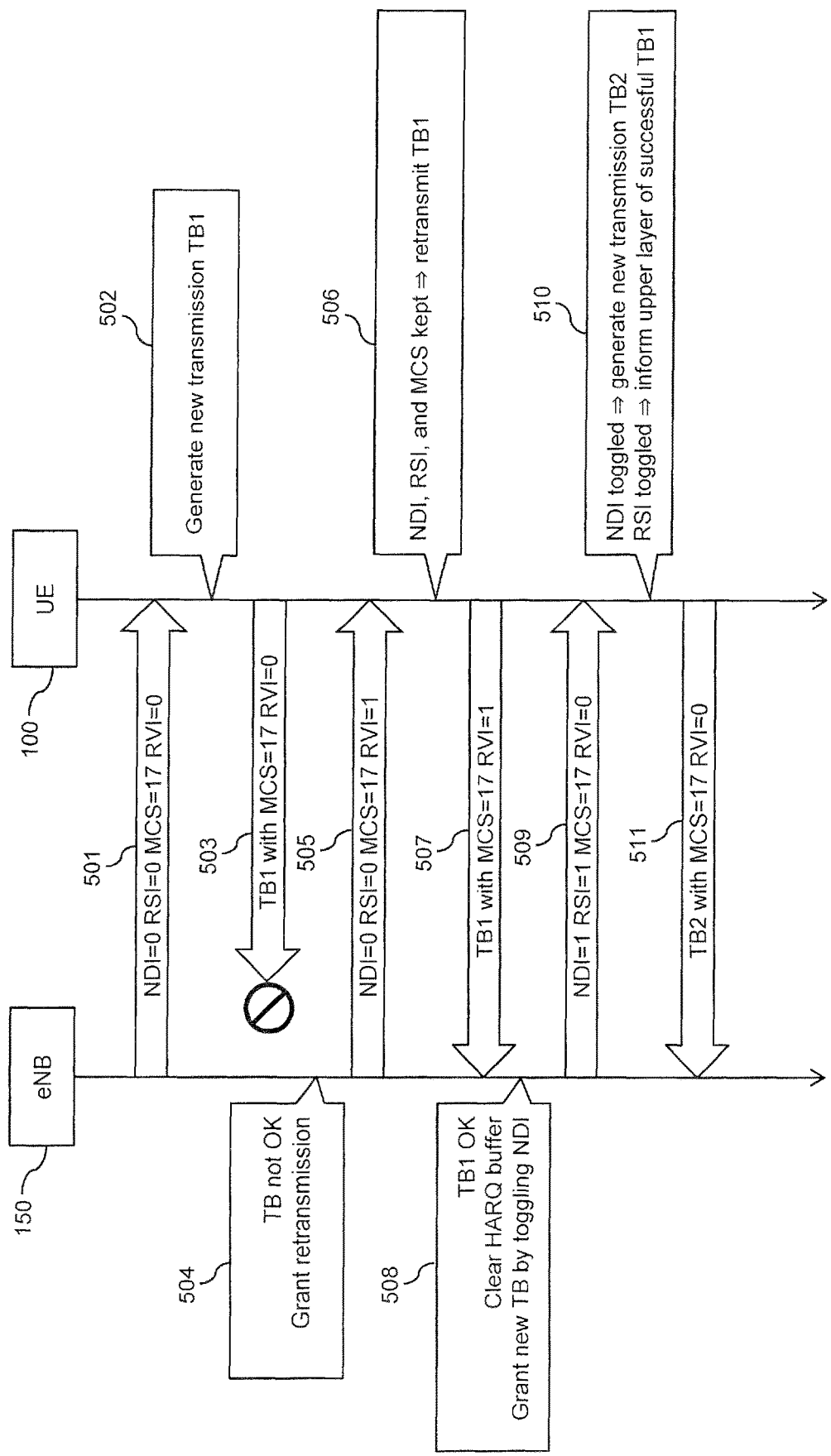
FIG. 5 shows a signal flow diagram for illustrating processes in a further exemplary scenario according to an embodiment of the invention.

The scenario of FIG. 5 involves a failed transmission of a TB, followed by a successful retransmission of this TB. In this scenario, the eNB 150 sends a first uplink grant 501 to the UE 100. As illustrated, the first uplink grant 501 includes the NDI with status "0", the RSI with status "0", an MCS index with value "17", and an RVI with value "0".

As illustrated by step 502, in response to receiving the first uplink grant 501, the UE 100 generates a new radio transmission of a first TB (TB1). The UE 100 then performs the radio transmission 503 of the first TB, using the MCS identified by MCS index 17 and the redundancy version identified by RVI 0.

As illustrated by step 504, the radio transmission 503 of the first TB is not successfully received by the eNB 150. In this respect, a not successfully received TB may correspond to a TB not received by the eNB 150 or to a TB received by the eNB 150 but being not decodable by the eNB 150. Accordingly, the eNB 150 grants a retransmission of the first TB by not toggling the NDI, i.e., keeping status "0" of the NDI and incrementing the RVI. Further, since the radio transmission 503 was not successfully received, the eNB 150 does not toggle the RSI, i.e., keeps status "0" of the RSI to indicate to the UE 100 that the first TB was not successfully received by the eNB 150.

The eNB 150 then sends a second uplink grant 505 to the UE 100. As illustrated, the second uplink grant 505 includes the untoggled NDI (still status "0") and the untoggled RSI (still status "0"). Further, the second uplink grant 505 includes an MCS index with value "17", and an RVI with value "1".

As illustrated by step 506, in response to receiving the second uplink grant 505 the UE 100 detects that the NDI, RSI, and MCS are unchanged as compared to the first uplink grant 501 and therefore decides to retransmit the first TB. The UE 100 then performs the retransmission 507 of the first TB, using the MCS identified by MCS index 17 and the redundancy version identified by RVI 1.

As illustrated by step 508, upon receiving the retransmission 507, the eNB 150 verifies that the first TB was successfully received, clears the HARQ buffer, grants transmission of a new TB by toggling the NDI from status "0" to "1", and resets the RVI to "0". Further, the eNB 150 toggles the RSI from status "0" to "1" to indicate to the UE 100 that the first TB was successfully received by the eNB 150.

The eNB 150 then sends a third uplink grant 509 to the UE 100. As illustrated, the third uplink grant 509 includes the toggled NDI (now status "1") and the toggled RSI (now status "1"). Further, the third uplink grant 509 includes an MCS index with value "17", and an RVI with value "0".

As illustrated by step 510, in response to receiving the third uplink grant 509, the UE 100 detects that the NDI was toggled as compared to the NDI in the second uplink grant 505 and therefore generates a new radio transmission of a second TB (TB2). Further, the UE 100 detects that RSI was toggled as compared to the RSI in the second uplink grant 505 and therefore informs the higher layer, e.g., the RLC layer, that the first TB was successfully received. The UE 100 then performs the radio transmission 511 of the second TB, using the MCS identified by MCS index 17 and the redundancy version identified by RVI 0.

Figure 6:
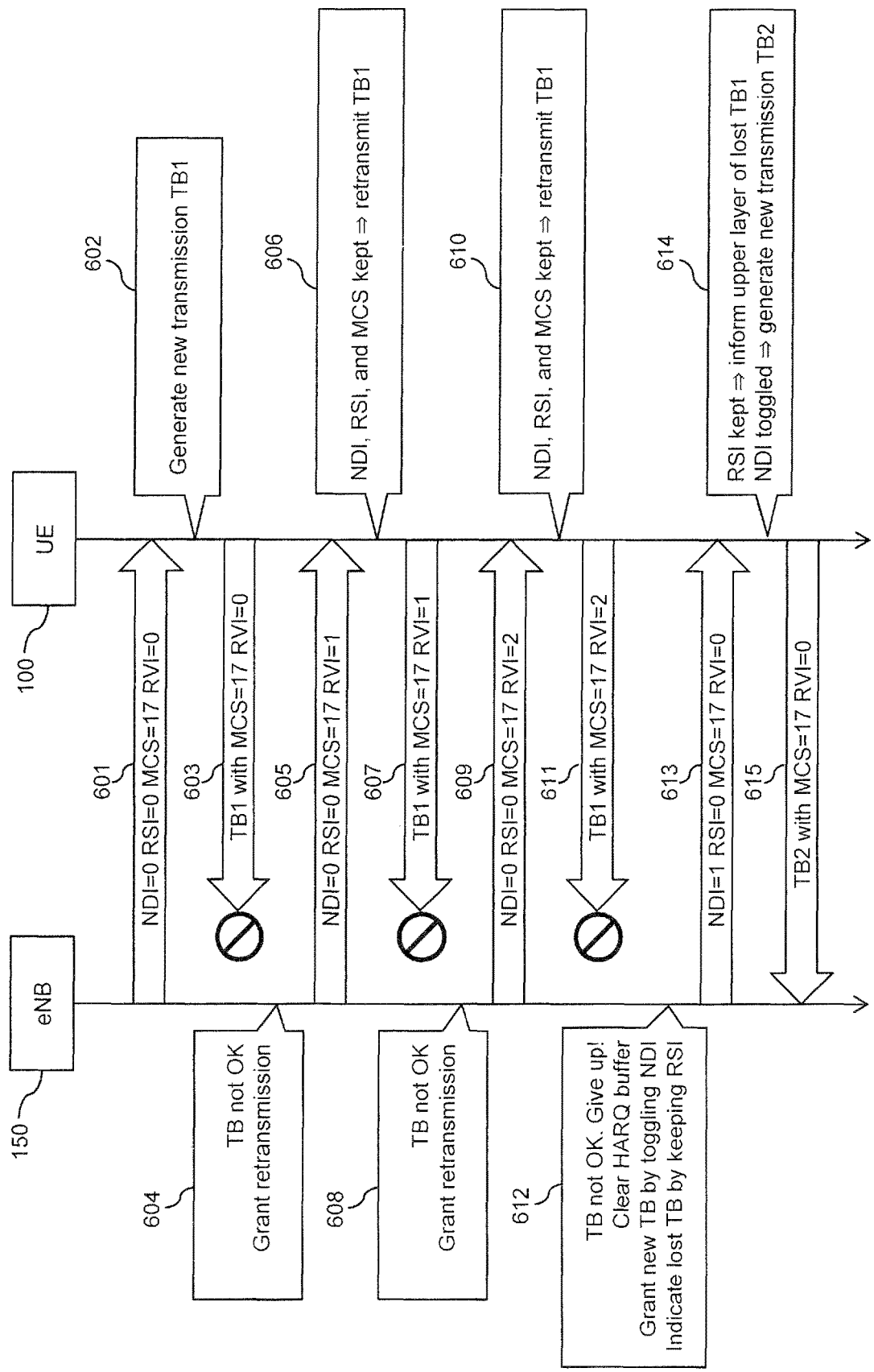
FIG. 6 shows a signal flow diagram for illustrating processes in a further exemplary scenario according to an embodiment of the invention.

The scenario of FIG. 6 involves a failed transmission of a TB, followed by multiple unsuccessful attempts of retransmitting the TB, until the eNB 150 eventually decides to refrain from further retransmission attempts and rather proceeds to a new radio transmission.

In the scenario of FIG. 6, the eNB 150 sends a first uplink grant 601 to the UE 100. As illustrated, the first uplink grant 601 includes the NDI with status "0", the RSI with status "0", an MCS index with value "17", and an RVI with value "0".

As illustrated by step 602, in response to receiving the first uplink grant 601, the UE 100 generates a new radio transmission of a first TB (TB1). The UE 100 then performs the radio transmission 603 of the first TB, using the MCS identified by MCS index 17 and the redundancy version identified by RVI 0.

As illustrated by step 604, the radio transmission 603 of the first TB is not successfully received by the eNB 150. Accordingly, the eNB 150 grants a retransmission of the first TB by not toggling the NDI, i.e., keeping status "0" of the NDI and incrementing the RVI. Further, since the radio transmission 603 was not successfully received, the eNB 150 does not toggle the RSI, i.e., keeps status "0" of the RSI to indicate to the UE 100 that the first TB was not successfully received by the eNB 150.

The eNB 150 then sends a second uplink grant 605 to the UE 100. As illustrated, the second uplink grant 605 includes the untoggled NDI (still status "0") and the untoggled RSI (still status "0"). Further, the second uplink grant 605 includes an MCS index with value "17", and an RVI with value "1".

As illustrated by step 606, in response to receiving the second uplink grant 605, the UE 100 detects that the NDI, RSI, and MCS are unchanged as compared to the first uplink grant 601 and therefore decides to retransmit the first TB. The UE 100 then performs the retransmission 607 of the first TB, using the MCS identified by MCS index 17 and the redundancy version identified by RVI 1.

As illustrated by step 608, the retransmission 607 of the first TB is also not successfully received by the eNB 150. Accordingly, the eNB 150 grants a further retransmission of the first TB by not toggling the NDI, i.e., keeping status "0" of the NDI and incrementing the RVI. Further, since the retransmission 607 was not successfully received, the eNB 150 does not toggle the RSI, i.e., keeps status "0" of the RSI to indicate to the UE 100 that the first TB was not successfully received by the eNB 150.

The eNB 150 then sends a third uplink grant 609 to the UE 100. As illustrated, the third uplink grant 609 includes the untoggled NDI (still status "0") and the untoggled RSI (still status "0"). Further, the third uplink grant 609 includes an MCS index with value "17", and an RVI with value "2".

As illustrated by step 610, in response to receiving the third uplink grant 609, the UE 100 detects that the NDI, RSI, and MCS are unchanged as compared to the second uplink grant 605 and therefore decides to retransmit the first TB. The UE 100 then performs the retransmission 611 of the first TB, using the MCS identified by MCS index 17 and the redundancy version identified by RVI 2.

As illustrated by step 612, the further retransmission 611 of the first TB is also not successfully received by the eNB 150. However, in this case the eNB 150 decides to give up and refrain from further retransmission attempts. For example, a maximum number of three transmission/retransmission attempts may be configured, and because this maximum number is reached, the eNB 150 may decide not to grant a further retransmission of the first TB, but rather grant transmission of a new TB, which may include different data than the first TB. The eNB 150 thus clears the HARQ buffer, toggles the NDI from status "0" to "1", and resets the RVI to "0". However, the eNB 150 does not toggle the RSI, i.e., keeps status "0" of the RSI, to indicate to the UE 100 that the first TB was not successfully received by the eNB 150.

The eNB 150 then sends a fourth uplink grant 613 to the UE 100. As illustrated, the fourth uplink grant 613 includes the toggled NDI (now status "1") and the untoggled RSI (still status "0"). Further, the fourth uplink grant 613 includes an MCS index with value "17", and an RVI with value "0".

As illustrated by step 614, in response to receiving the fourth uplink grant 613, the UE 100 detects that the NDI was toggled as compared to the NDI in the third uplink grant 609 and therefore generates a new radio transmission of a second TB (TB2). Further, the UE 100 detects that RSI was not toggled as compared to the RSI in the second third uplink grant 609 and therefore informs the higher layer, e.g., the RLC layer, that the first TB was lost, i.e., not successfully received. The UE 100 then performs the radio transmission 615 of the second TB, using the MCS identified by MCS index 17 and the redundancy version identified by RVI 0.

As can be seen, in the scenario of FIG. 6 the higher layer in the UE 100 is correctly notified of the first TB being lost, although the NDI alone might also have been interpreted as indicating that the first TB was successfully received, e.g., similar to step 510 of FIG. 5. In response to this notification, the higher layer in the UE 100 may for example keep data corresponding to the first TB in a transmit buffer of the higher layer, so that this data can be transmitted again to the eNB 150, without requiring a retransmission on the higher layer (which typically would also require new transmission of data corresponding to other TBs). In other scenarios, the notification of the higher layer in the UE 100 may trigger a retransmission on the higher layer, e.g., an ARQ retransmission by the ARQ entity 135 of the UE 100, without requiring that the UE 100 receives feedback on the higher layer regarding whether the initial transmission on the higher layer was successful.

Figure 7:
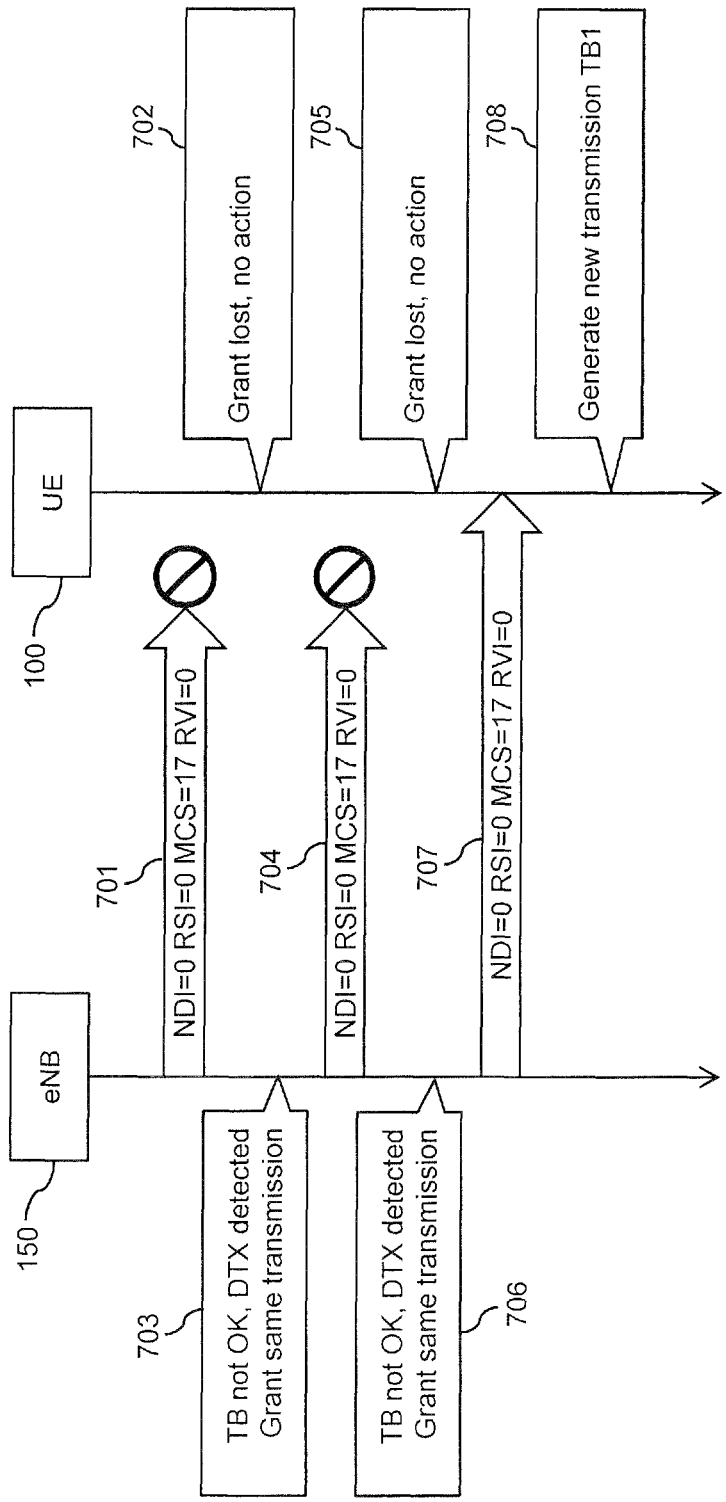
FIG. 7 shows a signal flow diagram for illustrating processes in a further exemplary scenario according to an embodiment of the invention.

The scenario of FIG. 7 involves a repeated failure of transmitting an uplink grant to the UE 100, eventually followed by a successful transmission of an uplink grant to the UE 100.

In the scenario of FIG. 7, the eNB 150 grants transmission of a TB by the UE 100 by sending a first uplink grant 701 to the UE 100. As illustrated, the first uplink grant 701 includes the NDI with status "0", the RSI with status "0", an MCS index with value "17", and an RVI with value "0".

As illustrated by step 702, the first uplink grant 701 is not successfully received by the UE 100. Accordingly, the UE 100 takes no further action at this point.

As illustrated by step 703, the eNB 150 then detects that the TB was not successfully received, and that there was no reaction to the first uplink grant 701 by the UE 100. Such kind of missing reaction of the UE 100 is also referred to as DTX (Discontinuous Transmission) event detectable by the eNB 150. In response to detecting the DTX event, the eNB 150 decides to grant transmission of the same TB again. In this case the eNB 150 does not toggle the NDI, i.e., keeps status "0" of the NDI, and also does not increment the RVI, i.e., keeps the RVI value of "0". Further, since the granted transmission of the TB was not successfully received, the eNB 150 does not toggle the RSI, i.e., keeps status "0" of the RSI. The eNB 150 then sends a second uplink grant 704 to the UE 100. As illustrated, the second uplink grant 704 includes the untoggled NDI with status "0", the untoggled RSI with status "0", an MCS index with value "17", and an RVI with value "0".

As illustrated by step 705, the second uplink grant 704 is also not successfully received by the UE 100. Accordingly, the UE 100 takes no further action at this point.

As illustrated by step 706, the eNB 150 then detects that the TB was still not successfully received, and that there was no reaction to the second uplink grant 704 by the UE 100, i.e., detects a further DTX event. In response to detecting the further DTX event, the eNB 150 decides to grant transmission of the same TB a further time. Also in this case the eNB 150 does not toggle the NDI, i.e., keeps status "0" of the NDI, and also does not increment the RVI, i.e., keeps the RVI value of "0". Further, since the granted transmission of the TB was not successfully received, the eNB 150 does not toggle the RSI, i.e., keeps status "0" of the RSI.

The eNB 150 then sends a third uplink grant 707 to the UE 100. As illustrated, the third uplink grant 707 includes the untoggled NDI with status "0", the untoggled RSI with status "0", an MCS index with value "17", and an RVI with value "0".

As illustrated by step 708, the third uplink grant 707 is successfully received by the UE 100. Accordingly, in response to receiving the third uplink grant 707, the UE 100 generates a new radio transmission of a first TB (TB1).

As can be seen from the scenario of FIG. 7, the eNB 150 may repeatedly send uplink grants with the same NDI and RSI until the UE 100 eventually responds to one of the sent uplink grants. A false notification of higher layers in the UE 100, that a TB which was actually transmitted by the UE 100 was not successfully received by the eNB 150, is avoided.

Figure 8:
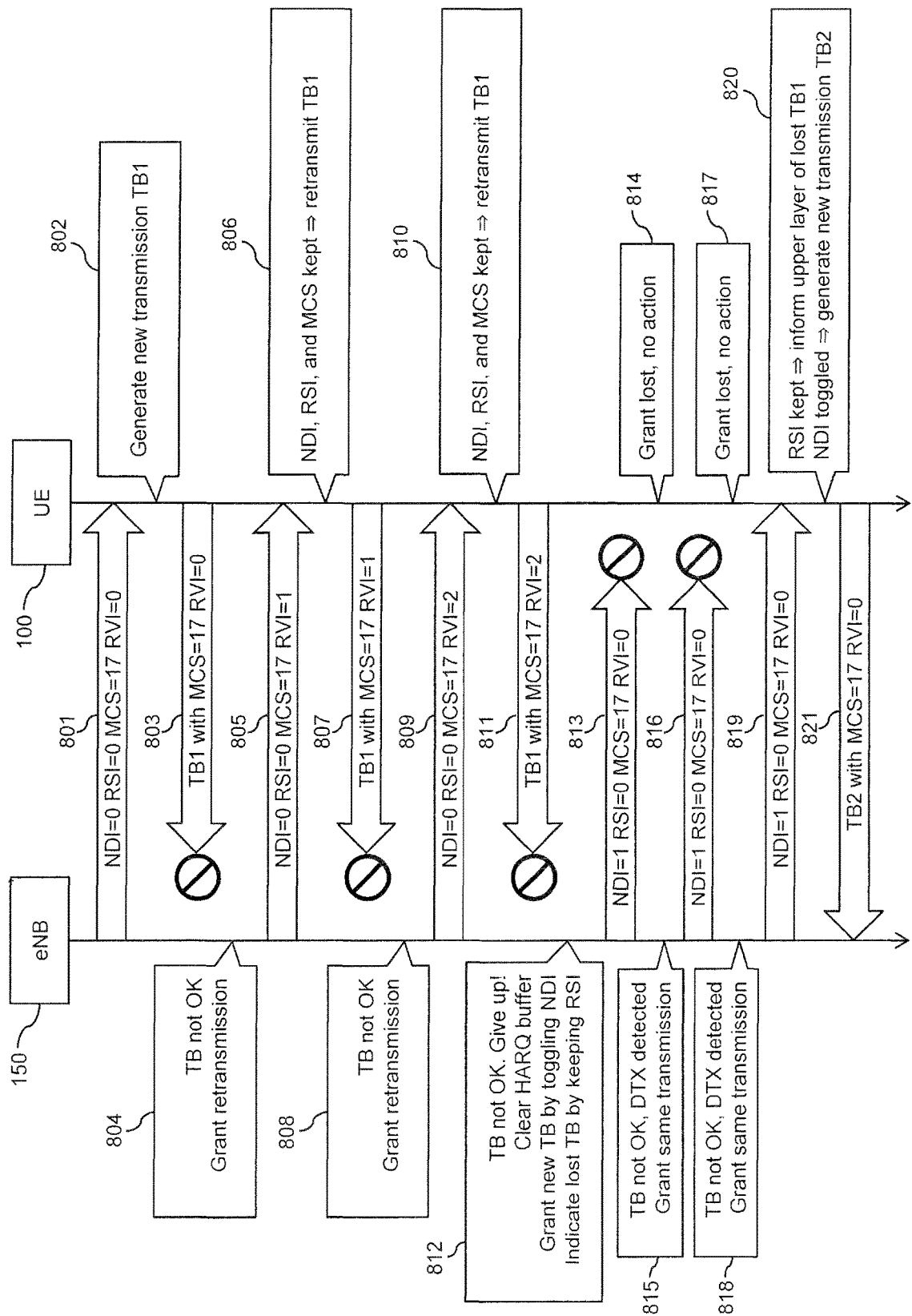
FIG. 8 shows a signal flow diagram for illustrating processes in a further exemplary scenario according to an embodiment of the invention.

The scenario of FIG. 8 involves a failed transmission of a TB, followed by multiple unsuccessful attempts of retransmitting the TB, until the eNB 150 eventually decides to refrain from further retransmission attempts and rather proceeds to grant a new radio transmission, followed by a repeated failure of transmitting an uplink grant to the UE 100, eventually followed by a successful transmission of an uplink grant to the UE 100.

In the scenario of FIG. 8, the eNB 150 sends a first uplink grant 801 to the UE 100. As illustrated, the first uplink grant 801 includes the NDI with status "0", the RSI with status "0", an MCS index with value "17", and an RVI with value "0".

As illustrated by step 802, in response to receiving the first uplink grant 801, the UE 100 generates a new radio transmission of a first TB (TB1). The UE 100 then performs the radio transmission 803 of the first TB, using the MCS identified by MCS index 17 and the redundancy version identified by RVI 0.

As illustrated by step 804, the radio transmission 803 of the first TB is not successfully received by the eNB 150. Accordingly, the eNB 150 grants a retransmission of the first TB by not toggling the NDI, i.e., keeping status "0" of the NDI and incrementing the RVI. Further, since the radio transmission 803 was not successfully received, the eNB 150 does not toggle the RSI, i.e., keeps status "0" of the RSI to indicate to the UE 100 that the first TB was not successfully received by the eNB 150.

The eNB 150 then sends a second uplink grant 805 to the UE 100. As illustrated, the second uplink grant 805 includes the untoggled NDI (still status "0") and the untoggled RSI (still status "0"). Further, the second uplink grant 805 includes an MCS index with value "17", and an RVI with value "1".

As illustrated by step 806, in response to receiving the second uplink grant 805, the UE 100 detects that the NDI, RSI, and MCS are unchanged as compared to the first uplink grant 801 and therefore decides to retransmit the first TB. The UE 100 then performs the retransmission 807 of the first TB, using the MCS identified by MCS index 17 and the redundancy version identified by RVI 1.

As illustrated by step 808, the retransmission 807 of the first TB is also not successfully received by the eNB 150. Accordingly, the eNB 150 grants a further retransmission of the first TB by not toggling the NDI, i.e., keeping status "0" of the NDI and incrementing the RVI. Further, since the retransmission 807 was not successfully received, the eNB 150 does not toggle the RSI, i.e., keeps status "0" of the RSI to indicate to the UE 100 that the first TB was not successfully received by the eNB 150.

The eNB 150 then sends a third uplink grant 809 to the UE 100. As illustrated, the third uplink grant 809 includes the untoggled NDI (still status "0") and the untoggled RSI (still status "0"). Further, the third uplink grant 809 includes an MCS index with value "17", and an RVI with value "2".

As illustrated by step 810, in response to receiving the third uplink grant 809, the UE 100 detects that the NDI, RSI, and MCS are unchanged as compared to the second uplink grant 805 and therefore decides to retransmit the first TB. The UE 100 then performs the retransmission 811 of the first TB, using the MCS identified by MCS index 17 and the redundancy version identified by RVI 2.

As illustrated by step 812, the further retransmission 811 of the first TB is also not successfully received by the eNB 150. However, in this case the eNB 150 decides to give up and refrain from further retransmission attempts. For example, a maximum number of three transmission/retransmission attempts may be configured, and because this maximum number is reached, the eNB 150 may decide not to grant a further retransmission of the first TB, but rather grant transmission of a new TB, which may include different data than the first TB. The eNB 150 thus clears the HARQ buffer, toggles the NDI from status "0" to "1", and resets the RVI to "0". However, the eNB 150 does not toggle the RSI, i.e., keeps status "0" of the RSI, to indicate to the UE 100 that the first TB was not successfully received by the eNB 150.

The eNB 150 grants transmission of the new TB by the UE 100 by sending a fourth uplink grant 813 to the UE 100. As illustrated, the fourth uplink grant 813 includes the toggled NDI (now status "1") and the untoggled RSI (still status "0"). Further, the fourth uplink grant 813 includes an MCS index with value "17", and an RVI with value "0".

As illustrated by step 814, the fourth uplink grant 813 is not successfully received by the UE 100. Accordingly, the UE 100 takes no further action at this point.

As illustrated by step 815, the eNB 150 then detects that the new TB was not successfully received, and that there was no reaction to the fourth uplink grant 813 by the UE 100, i.e., detects a DTX event. In response to detecting the DTX event, the eNB 150 decides to grant transmission of the new TB again. In this case the eNB 150 does not toggle the NDI, i.e., keeps status "1" of the NDI, and also does not increment the RVI, i.e., keeps the RVI value of "0". Further, since the granted transmission of the new TB was not successfully received, the eNB 150 does not toggle the RSI, i.e., keeps status "0" of the RSI.

The eNB 150 then sends a fifth uplink grant 816 to the UE 100. As illustrated, the fifth uplink grant 816 includes the untoggled NDI with status "1", the untoggled RSI with status "0", an MCS index with value "17", and an RVI with value "0".

As illustrated by step 817, the fifth uplink grant 816 is also not successfully received by the UE 100. Accordingly, the UE 100 takes no further action at this point.

As illustrated by step 818, the eNB 150 then detects that the new TB was still not successfully received, and that there was no reaction to the fifth uplink grant 816 by the UE 100, i.e., detects a further DTX event. In response to detecting the further DTX event, the eNB 150 decides to grant transmission of the new TB a further time. Also in this case the eNB 150 does not toggle the NDI, i.e., keeps status "0" of the NDI, and also does not increment the RVI, i.e., keeps the RVI value of "0". Further, since the granted transmission of the new TB was not successfully received, the eNB 150 does not toggle the RSI, i.e., keeps status "0" of the RSI.

The eNB 150 then sends a sixth uplink grant 819 to the UE 100. As illustrated, the sixth uplink grant 819 includes the untoggled NDI with status "0", the untoggled RSI with status "0", an MCS index with value "17", and an RVI with value "0".

As illustrated by step 820, the sixth uplink grant 819 is successfully received by the UE 100. Accordingly, in response to receiving the sixth uplink grant 819, the UE 100 generates a new radio transmission of a second TB (TB2). Further, the UE 100 detects that the RSI was not toggled as compared to the RSI in the last received uplink grant, i.e., the third uplink grant 809, and therefore informs the higher layer, e.g., the RLC layer, that the first TB was lost, i.e., not successfully received. The UE 100 then performs the radio transmission 821 of the second TB, using the MCS identified by MCS index 17 and the redundancy version identified by RVI 0.

As can be seen from the scenario of FIG. 8, by utilizing the RSI, the UE 100 can reliably determine that the first TB was not successfully received by the eNB 150, even though the eNB 150 at some point decides to refrain from granting further retransmission attempts for the first TB and rather grant transmission of a new TB, but then the transmission of uplink grants to the UE 100 fails, which means that the UE 100 does not receive the NDI and RSI immediately after the decision to grant the transmission of the new TB. Rather, once an uplink grant can be successfully received by the UE 100, the UE 100 can also reliably derive that the first TB block was not successfully received by the eNB 150.

Figure 9:
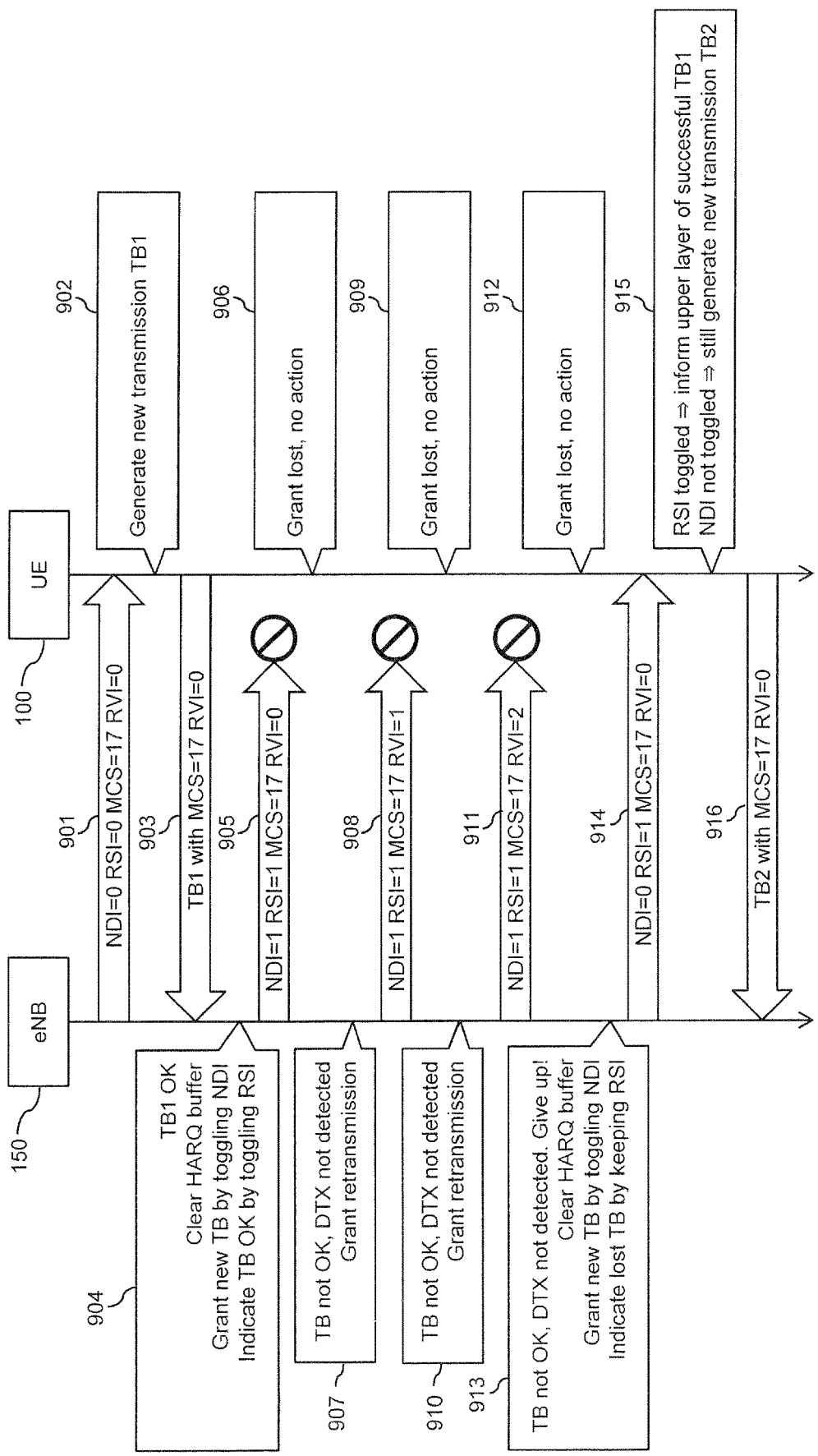
FIG. 9 shows a signal flow diagram for illustrating processes in a further exemplary scenario according to an embodiment of the invention.

The scenario of FIG. 9 involves an initially successful transmission of a TB, followed by a repeated failure of transmitting an uplink grant to the UE 100, eventually followed by a successful transmission of an uplink grant to the UE 100.

In the scenario of FIG. 9, the eNB 150 sends a first uplink grant 901 to the UE 100. As illustrated, the first uplink grant 901 includes the NDI with status "0", the RSI with status "0", an MCS index with value "17", and an RVI with value "0".

As illustrated by step 902, in response to receiving the first uplink grant 901, the UE 100 generates a new radio transmission of a first TB (TB1). The UE 100 then performs the radio transmission 903 of the first TB, using the MCS identified by MCS index 17 and the redundancy version identified by RVI 0.

As illustrated by step 904, upon receiving the radio transmission 903 of the first TB, the eNB 150 verifies that the first TB was successfully received, clears the HARQ buffer, grants transmission of a new TB by toggling the NDI from status "0" to "1", and resets the RVI to "0". Further, the eNB 150 toggles the RSI from status "0" to "1" to indicate to the UE 100 that the first TB was successfully received by the eNB 150.

The eNB 150 then sends a second uplink grant 905 to the UE 100. As illustrated, the second uplink grant 905 includes the toggled NDI (now status "1") and the toggled RSI (now status "1"). Further, the further uplink grant 905 includes an MCS index with value "17", and an RVI with value "0".

As illustrated by step 906, the second uplink grant 905 is not successfully received by the UE 100. Accordingly, the UE 100 takes no further action at this point.

As illustrated by step 907, the eNB 150 then detects that the new TB was not successfully received, however without detecting a DTX event, e.g., because the eNB 150 wrongly detects that there was a radio transmission from the UE 100. In this case the eNB 150 decides to grant a retransmission of the new TB. As can be seen, the eNB 150 does not toggle the NDI, i.e., keeps status "1" of the NDI, and increments the RVI. Further, since the granted transmission of the new TB was not successfully received, the eNB 150 does not toggle the RSI, i.e., keeps status "1" of the RSI.

The eNB 150 then sends a third uplink grant 908 to the UE 100. As illustrated, the third uplink grant 908 includes the untoggled NDI with status "1", the untoggled RSI with status "1", an MCS index with value "17", and an RVI with value "1".

As illustrated by step 909, the third uplink grant 908 is also not successfully received by the UE 100. Accordingly, the UE 100 takes no further action at this point.

As illustrated by step 910, the eNB 150 then detects that the new TB was still not successfully received, without detecting a DTX event. In this case the eNB 150 decides to grant a further retransmission of the new TB. As can be seen, the eNB 150 does not toggle the NDI, i.e., keeps status "1" of the NDI, and increments the RVI. Further, since the granted transmission of the new TB was not successfully received, the eNB 150 does not toggle the RSI, i.e., keeps status "1" of the RSI. However, the eNB 150 increments the RVI.

The eNB 150 then sends a fourth uplink grant 911 to the UE 100. As illustrated, the fourth uplink grant 911 includes the untoggled NDI with status "1", the untoggled RSI with status "1", an MCS index with value "17", and an RVI with value "2".

As illustrated by step 912, the fourth uplink grant 911 is also not successfully received by the UE 100. Accordingly, the UE 100 takes no further action at this point.

As illustrated by step 913, the eNB 150 then detects that the new TB was still not successfully received, without detecting a DTX event. However, in this case the eNB 150 decides to give up and refrain from granting further retransmission attempts. For example, a maximum number of three transmission/retransmission attempts may be configured, and because this maximum number is reached, the eNB 150 may decide not to grant a further retransmission, but rather again grant transmission of a new TB. The eNB 150 thus clears the HARQ buffer, toggles the NDI from status "1" to "0", and resets the RVI to "0". However, the eNB 150 does not toggle the RSI, i.e., keeps status "1" of the RSI, because there was no successful reception of a TB after the second uplink grant 905.

The eNB 150 grants transmission of the new TB by the UE 100 by sending a fifth uplink grant 914 to the UE 100. As illustrated, the fifth uplink grant 914 includes the toggled NDI (now status "0") and the untoggled RSI (still status "1"). Further, the fifth uplink grant 914 includes an MCS index with value "17", and an RVI with value "0".

As illustrated by step 915, the fifth uplink grant 914 is successfully received by the UE 100. Accordingly, in response to receiving the fifth uplink grant 914, the UE 100 detects that the RSI was toggled as compared to the RSI in the last received uplink grant, i.e., the first uplink grant 901, and therefore informs the higher layer, e.g., the RLC layer, that the first TB was successfully received. Further, since the RSI was toggled, the UE 100 generates a new radio transmission of a second TB (TB2), even though the NDI was not toggled compared to the last received ULgrant 901. In this scenario, it is thus assumed that detecting based on the RSI that a radio transmission was successful can trigger a new transmission, independently of whether the NDI is toggled or not. In other words, the RSI overrides the NDI. Repeated attempts to transmit a TB which was already successfully transmitted (in the present example the first TB) can thus be avoided. The UE 100 then performs the radio transmission 916 of the second TB, using the MCS identified by MCS index 17 and the redundancy version identified by RVI 0.

As can be seen from the scenario of FIG. 9, since the RSI allows for reliably determining that a TB was successfully received, the UE 100 can move to performing a radio transmission of a new TB even though uplink grants which would have triggered such radio transmission of a new TB were not successfully received by the UE 100.

Figure 10:
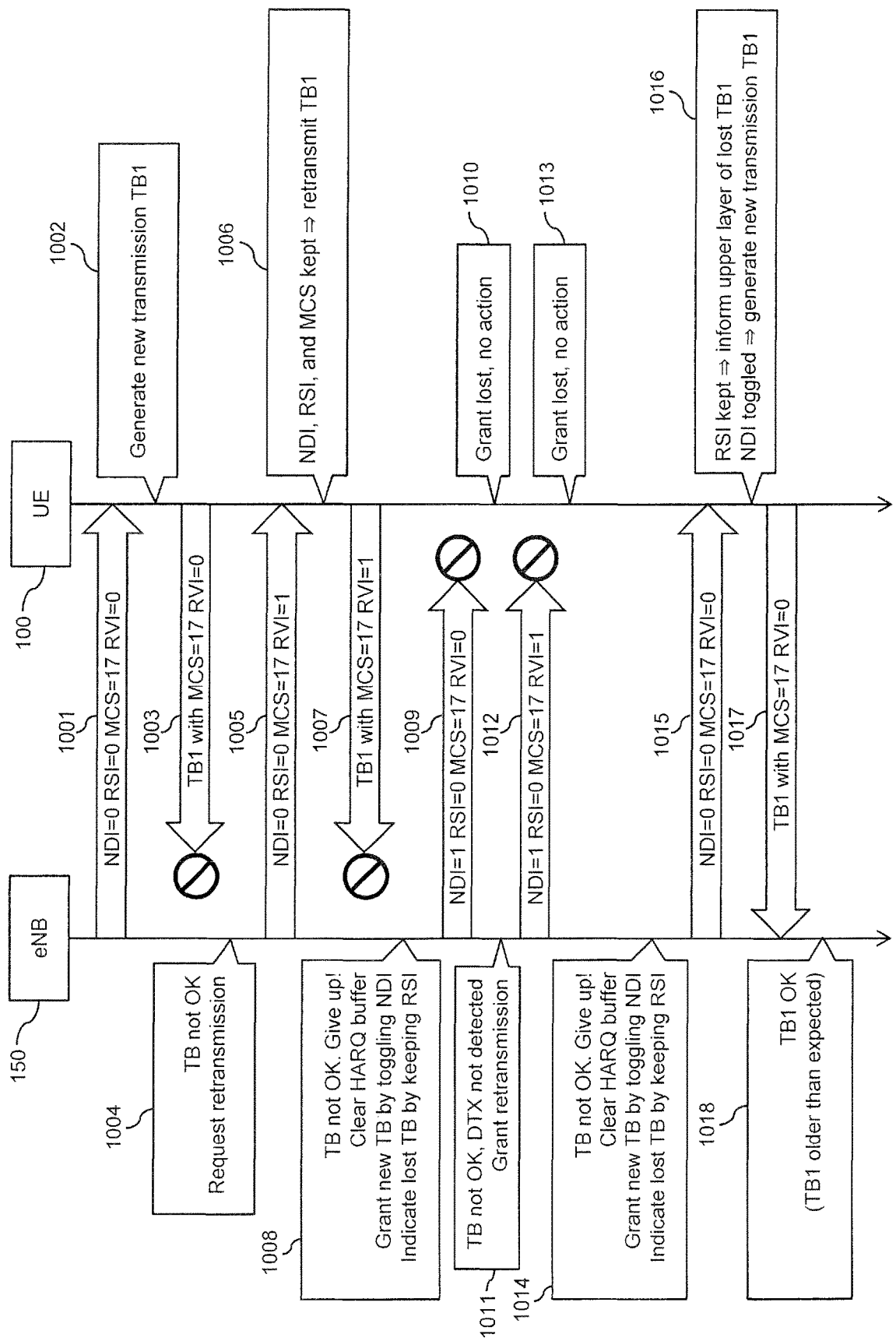
FIG. 10 shows a signal flow diagram for illustrating processes in a further exemplary scenario according to an embodiment of the invention.

The scenario of FIG. 10 involves a failed transmission of a TB, followed by a repeated failure of transmitting an uplink grant to the UE 100, eventually followed by a successful new radio transmission.

In the scenario of FIG. 10, the eNB 150 sends a first uplink grant 1001 to the UE 100. As illustrated, the first uplink grant 1001 includes the NDI with status "0", the RSI with status "0", an MCS index with value "17", and an RVI with value "0".

As illustrated by step 1002, in response to receiving the first uplink grant 1001, the UE 100 generates a new radio transmission of a first TB (TB1). The UE 100 then performs the radio transmission 1003 of the first TB, using the MCS identified by MCS index 17 and the redundancy version identified by RVI 0.

As illustrated by step 1004, the radio transmission 1003 of the first TB is not successfully received by the eNB 150. Accordingly, the eNB 150 grants a retransmission of the first TB by not toggling the NDI, i.e., keeping status "0" of the NDI and incrementing the RVI. Further, since the radio transmission 1003 was not successfully received, the eNB 150 does not toggle the RSI, i.e., keeps status "0" of the RSI to indicate to the UE 100 that the first TB was not successfully received by the eNB 150.

The eNB 150 then sends a second uplink grant 1005 to the UE 100. As illustrated, the second uplink grant 1005 includes the untoggled NDI (still status "0") and the untoggled RSI (still status "0"). Further, the second uplink grant 1005 includes an MCS index with value "17", and an RVI with value "1".

As illustrated by step 1006, in response to receiving the second uplink grant 1005, the UE 100 detects that the NDI, RSI, and MCS are unchanged as compared to the first uplink grant 1001 and therefore decides to retransmit the first TB. The UE 100 then performs the retransmission 1007 of the first TB, using the MCS identified by MCS index 17 and the redundancy version identified by RVI 1.

As illustrated by step 1008, the retransmission 1007 of the first TB is also not successfully received by the eNB 150. However, in this case the eNB 150 decides to give up and refrain from further retransmission attempts. For example, a maximum number of two transmission/retransmission attempts may be configured, and because this maximum number is reached, the eNB 150 may decide not to grant a further retransmission of the first TB, but rather grant transmission of a new TB, which may include different data than the first TB. The eNB 150 thus clears the HARQ buffer, toggles the NDI from status "0" to "1", and resets the RVI to "0". However, the eNB 150 does not toggle the RSI, i.e., keeps status "0" of the RSI, to indicate to the UE 100 that the first TB was not successfully received by the eNB 150.

The eNB 150 then sends a third uplink grant 1009 to the UE 100. As illustrated, the third uplink grant 1009 includes the toggled NDI (now status "1") and the untoggled RSI (still status "0"). Further, the third uplink grant 1009 includes an MCS index with value "17", and an RVI with value "0".

As illustrated by step 1010, the third uplink grant 1009 is not successfully received by the UE 100. Accordingly, the UE 100 takes no further action at this point.

As illustrated by step 1011, the eNB 150 then detects that the new TB was not successfully received, without detecting a DTX event, e.g., due to wrongly detecting a radio transmission from the UE 100. In this case the eNB 150 decides to grant a retransmission of the new TB. As can be seen, the eNB 150 does not toggle the NDI, i.e., keeps status "1" of the NDI, and increments the RVI. Further, since no TB was successfully received, the eNB 150 does not toggle the RSI, i.e., keeps status "0" of the RSI.

The eNB 150 then sends a fourth uplink grant 1012 to the UE 100. As illustrated, the fourth uplink grant 1012 includes the untoggled NDI with status "1", the untoggled RSI with status "0", an MCS index with value "17", and an RVI with value "1".

As illustrated by step 1013, the fourth uplink grant 1012 is not successfully received by the UE 100. Accordingly, the UE 100 takes no further action at this point.

As illustrated by step 1014, the eNB 150 then detects that the new TB was still not successfully received, without detecting a DTX event. However, in this case the eNB 150 decides to give up and refrain from granting further retransmission attempts. For example, a maximum number of two transmission/retransmission attempts may be configured, and because this maximum number is reached, the eNB 150 may decide not to grant a further retransmission, but rather again grant transmission of a new TB. The eNB 150 thus clears the HARQ buffer, toggles the NDI from status "1" to "0", and resets the RVI to "0". However, the eNB 150 does not toggle the RSI, i.e., keeps status "0" of the RSI, because there was no successful reception of a TB.

The eNB 150 grants transmission of the new TB by the UE 100 by sending a fifth uplink grant 1015 to the UE 100. As illustrated, the fifth uplink grant 1015 includes the toggled NDI (now status "0") and the untoggled RSI (still status "0"). Further, the fifth uplink grant 1015 includes an MCS index with value "17", and an RVI with value "0".

As illustrated by step 1016, the fifth uplink grant 1015 is successfully received by the UE 100. Accordingly, in response to receiving the fifth uplink grant 1015, the UE 100 detects that the RSI was not toggled as compared to the RSI in the last received uplink grant, i.e., the second uplink grant 1005, and may therefore inform the higher layer, e.g., the RLC layer, that the first TB was lost. Further, since the NDI was not toggled as compared to the NDI in the last received uplink grant, i.e., the second uplink grant 1005, the UE 100 decides to perform a retransmission of the first TB. The UE 100 then performs the retransmission 1017 of the first TB, using the MCS identified by MCS index 17 and the redundancy version identified by RVI 0.

As illustrated by step 1018, upon receiving the retransmission 1017 of the first TB, the eNB 150 verifies that the first TB was successfully received. From the perspective of the eNB 150 the first TB is older than expected because at step 1008 the eNB 150 already decided to abandon the first TB. However, the received first TB may nonetheless be useful, and further transmissions of corresponding data can thus be avoided.

As can be seen from the scenarios of FIGS. 4 to 10, the utilization of the RSI allows for reliably controlling radio transmissions and retransmissions. Further, not just scenarios involving a single error as assumed in the scenario of FIG. 5, but even complex scenarios involving multiple errors as assumed in the scenarios of FIGS. 6 to 10 may be addressed in an efficient manner.

As already mentioned above, the RSI may be utilized to reliably determine whether or not a previous radio transmission of a TB was successfully received. In some cases, the UE 100 may detect that the RSI was not toggled, but the NDI and/or MCS was changed, and determine therefrom that the TB was not successfully received. This may in turn be used for providing corresponding local feedback, i.e., a local NACK, to a higher protocol layer. If this higher protocol layer supports retransmit functionalities, such as RLC AM in the LTE radio technology, the data corresponding to the TB may be reinserted into a transmit buffer of the higher protocol layer. On the higher layer, the data corresponding to the TB may then be retransmitted. This may be accomplished by retransmitting the PDU from which the TB was originally generated or by transmitting one or more new PDUs including the data corresponding to the TB. When performing such retransmission, the data corresponding to the TB may also be segmented into multiple new TBs.

In some cases, the UE 100 may detect that the RSI was toggled and determine therefrom that a previous radio transmission of a TB was successfully received by the eNB 150. This may in turn be used for providing corresponding local feedback, i.e., a local ACK, to a higher protocol layer. If this higher protocol layer supports retransmit functionalities, such as RLC AM in the LTE radio technology, the data corresponding to the TB may be removed from a retransmission buffer of the higher protocol layer. In this way, buffering on the higher protocol layer may be performed in a more resource efficient manner. Further, the local ACK may also be used for controlling a timer used for triggering retransmissions on the higher protocol layer, e.g., a timer referred to as t-PollRetransmit as mentioned 3PPP TS 36.322. For example, the local ACK may be used to stop or restart such timer. In some cases, the data corresponding to the TB may be removed in response to also success of the next radio transmission of the corresponding HARQ process is confirmed by a local ACK. While this may require larger buffer sizes, it may allow for achieving a higher robustness with respect to false detection of DCI.

In some cases, the UE 100 may determine based on the RSI that a TB was not successfully received by the eNB 150. If this TB included control information, e.g., one or more MAC control elements, the UE 100 may decide to retransmit the control information or to newly generate the control information. For example, such control information included in the TB may correspond to a MAC control element conveying a buffer status report (BSR). In such embodiments, no local feedback to a higher layer, e.g., the RLC layer, may need to be provided. Alternatively, the local feedback may be provided to the higher layer. retransmission of the control information may be performed by the layer performing the evaluation of the RSI.

In some embodiments, in response to determining that the TB was not successfully received, the UE 100 may generate a new BSR. In some scenarios, such new BSR may include information provided by a higher protocol layer, e.g., the RLC layer, and reflecting local feedback provided to the higher protocol layer in response to detecting that the TB was not successfully received. For example, the new BSR may indicate a buffer status which already considers the local NACK provided to the higher layer. Further, the new BSR may indicate new data which have arrived at the higher after generating the original BSR. In other scenarios, the original BSR could be retransmitted.

In some scenarios, the UE 100 may start a timer when successfully receiving an uplink grant for a certain HARQ process. This timer may also be considered by the UE 100 when evaluating the received RSI. For example, the value of the RSI in the next received uplink grant for the same HARQ process may be used for determining whether the corresponding TB was successfully received as long as the timer is running. Once the timer has expired, the UE 100 may perform a radio transmission of a new TB, irrespective of the status of the NDI and/or RSI included in this next uplink grant.

In some scenarios, also a higher protocol layer, e.g., the RLC layer, may provide feedback information to the HARQ process. For example, the higher protocol layer may indicate to the HARQ entity 125 of the UE 100 that data corresponding to a certain TB in a HARQ process was successfully received by the eNB 150.

Figure 11:
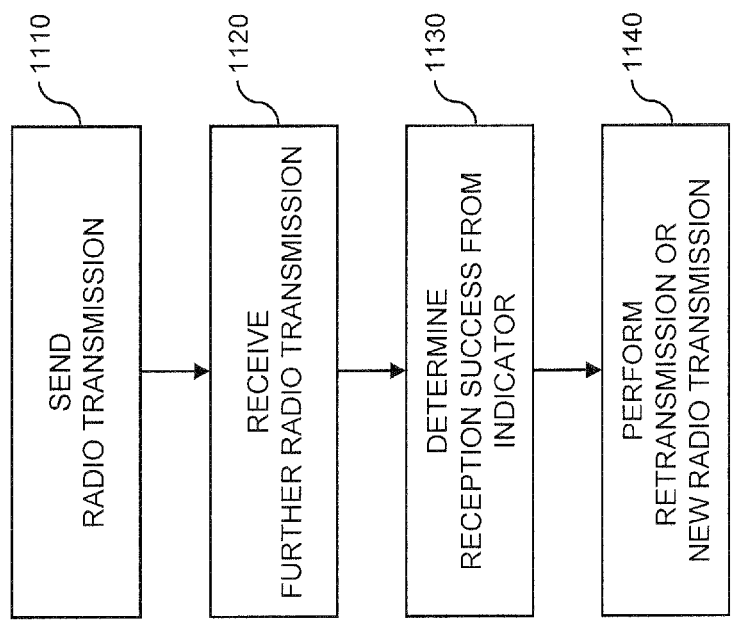
FIG. 11 shows a flowchart for illustrating a method according to an embodiment of the invention, which may be implemented by a sending radio device.

FIG. 11 shows a flowchart for illustrating a method which may be utilized for implementing the illustrated concepts in a radio device which acts as a sender of radio transmissions, e.g., in a terminal device performing uplink radio transmissions to a cellular radio network, such as the UE 100. The radio device may for example correspond to a mobile phone or to a computer with cellular radio network connectivity. If a processor-based implementation of the radio device is used, the steps of the method may be performed by one or more processors of the radio device. In such a case the radio device may further comprise a memory for storing program code which, when executed by the processor(s), causes the radio device to perform the steps of the method.

At step 1110, the radio device sends a radio transmission to a further radio device. If the radio device corresponds to a terminal device connected to a cellular radio network, the further radio device may correspond to a base station of the cellular radio network, such as the eNB 150. The radio transmission may for example correspond to transmission of a TB of the LTE radio technology or another cellular radio technology, e.g., a TB as sent on the PHY layer and including a MAC PDU. Examples of such radio transmission performed by the radio device are the radio transmissions 403 and 407 of FIG. 4, the radio transmissions 503, 507, and 511 of FIG. 5, the radio transmissions 603, 607, 611, and 615 of FIG. 6, the radio transmissions 803, 807, 811, and 821 of FIG. 8, the radio transmissions 903 and 916 of FIG. 9, and the radio transmissions 1003, 1007, and 1017 of FIG. 10.

At step 1120, the radio device receives a further radio transmission from the further radio device. The further radio transmission includes an indicator of reception success. The indicator of reception success may be represented by a single bit. The indicator of reception success may for example correspond to the above-mentioned RSI. If the radio device corresponds to a terminal device connected to a cellular radio network and the further radio device corresponds to a base station of the cellular radio network, the further radio transmission may include an uplink grant indicating uplink radio resources allocated to the radio device. The further radio transmission may be protected by a CRC code and may be transmitted on a physical control channel, such as the PDCCH of the LTE radio technology, e.g., in DCI transmitted on the PDCCH. Examples of such further radio transmission are the uplink grant 405 of FIG. 4, the uplink grants 505 and 509 of FIG. 5, the uplink grants 605, 609, and 613 of FIG. 6, the uplink grants 805, 809, and 819 of FIG. 8, the uplink grant 914 of FIG. 9, and the uplink grants 1005 and 1015 of FIG. 10.

At step 1130, the radio device determines reception success of the radio transmission from the indicator received at step 1120. Specifically, in response to the indicator being toggled with respect to a previous state of the indicator, the radio device determines that the radio transmission was successfully received by the further radio device. Further, in response to the received indicator not being toggled with respect to the previous state of the indicator, the radio device determines that the radio transmission failed. Here, the previous state of the indicator may be defined by the state of the indicator as indicated in a radio transmission last received from the further radio device. If the radio transmission is based on the LTE radio technology, such last radio transmission may correspond to the last uplink grant received for the same HARQ process as the radio transmission. However, in some scenarios the previous state of the indicator could also correspond to a well-defined initial state. Such initial state may for example be preconfigured in the radio device and the further radio device.

The determination whether the radio transmission was successfully received or the radio transmission failed may be performed by a MAC entity of the radio device, such as the MAC entity 120 of FIG. 1. A result of the determination may then be indicated by the MAC entity to a higher layer entity of the radio device. An example of such higher layer entity is the RLC entity 130 of FIG. 1. The result of the determination may thus be utilized for providing local feedback between different protocol layers of the radio device. Depending on the indicated result of the determination, the higher layer entity may then initiating a retransmission, control buffering of data for retransmission.

Depending on a result of the determination whether the radio transmission was successfully received or the radio transmission failed, the radio device may also sending control information to the further radio device. For example, the radio device may resend control information affected by a failure of the radio transmission or may newly generate control information affected by a failure of the radio transmission and then sent this newly generated control information. The control information may for example correspond to a MAC control element, e.g., a MAC control element carrying a BSR. Depending on a result of the determination whether the radio transmission was successful or failed, the radio device may thus send a report to the further radio device. Such report may be a BSR. However, it is noted that the sending of other kinds of reports could also be controlled depending on the result of the determination, and that such reports do not necessarily need to be sent on the MAC layer. In such a case no local feedback to a higher layer, e.g., an RLC layer, may needs to be provided.

In some scenarios determination whether the radio transmission failed may further depend on a timer. Specifically, in response to expiry of the timer before receiving the further radio transmission, the radio device may determine that the radio transmission failed. This determination can be made irrespective of the status of the indicator included in the further radio transmission received after expiry of the timer.

In some scenarios, the further radio transmission includes a further indicator of a new radio transmission. The further indicator may be represented by a single bit. An example of such further indicator is the above-mentioned NDI. Depending on this further indicator, the radio device may decide between performing a new radio transmission to the further radio device and performing a retransmission of the radio transmission. Specifically, in response to the further indicator being toggled with respect to a previous state of the further indicator, the radio device may perform a new radio transmission to the further radio device, and in response to the further indicator not being toggled with respect to the previous state of the further indicator, the radio device may perform a retransmission of the radio transmission. Here, the previous state of the further indicator may be defined by the state of the further indicator as indicated in a radio transmission last received from the further radio device. If the radio transmission is based on the LTE radio technology, such last radio transmission may correspond to the last uplink grant received for the same HARQ process as the radio transmission. However, in some scenarios the previous state of the further indicator could also correspond to a well-defined initial state. Such initial state may for example be preconfigured in the radio device and the further radio device.

At step 1140, the radio device may perform a retransmission of the radio transmission or a new transmission to the further radio device. Depending on the result of the determination whether the radio transmission failed, the radio device may decide whether to perform the retransmission or the new transmission formed this decision may also depend on the further indicator, which may be optionally received by the radio device. Further, in cases where the radio device determines failure of the radio transmission in response to expiry of a timer, the radio device may decide to perform a new radio transmission rather than performing a retransmission.

For example, if the indicator was toggled and the further indicator was toggled, the radio device may perform a new transmission, such as explained in connection with step 510 of FIG. 5, where both the RSI and the NDI are found to be toggled and the UE 100 thus performs the radio transmission 511 as a new transmission, following the NDI. Further, if the indicator was not toggled and the further indicator was toggled, the radio device may perform a new transmission, such as explained in connection with step 820 of FIG. 8, where the RSI is found to be untoggled and the NDI is found to be toggled and the UE 100 thus performs the radio transmission 821 as new transmission, following the NDI. Further, if both the indicator and the further indicator were not toggled, the radio device may perform a retransmission, such as explained in connection with step 1016 of FIG. 10, where both the RSI and the NDI are found to be untoggled and the UE 100 thus performs the radio transmission 1017 as a retransmission, following the NDI. Further, if the indicator was toggled and the further indicator was not toggled, the indicator may override the further indicator and the radio device may proceed to perform a new transmission, such as explained in connection with step 915 of FIG. 9, where the RSI is found to be toggled and the NDI is found to be untoggled and the UE 100 performs the radio transmission 916 as a new transmission, overriding the NDI with the RSI.

Figure 12:
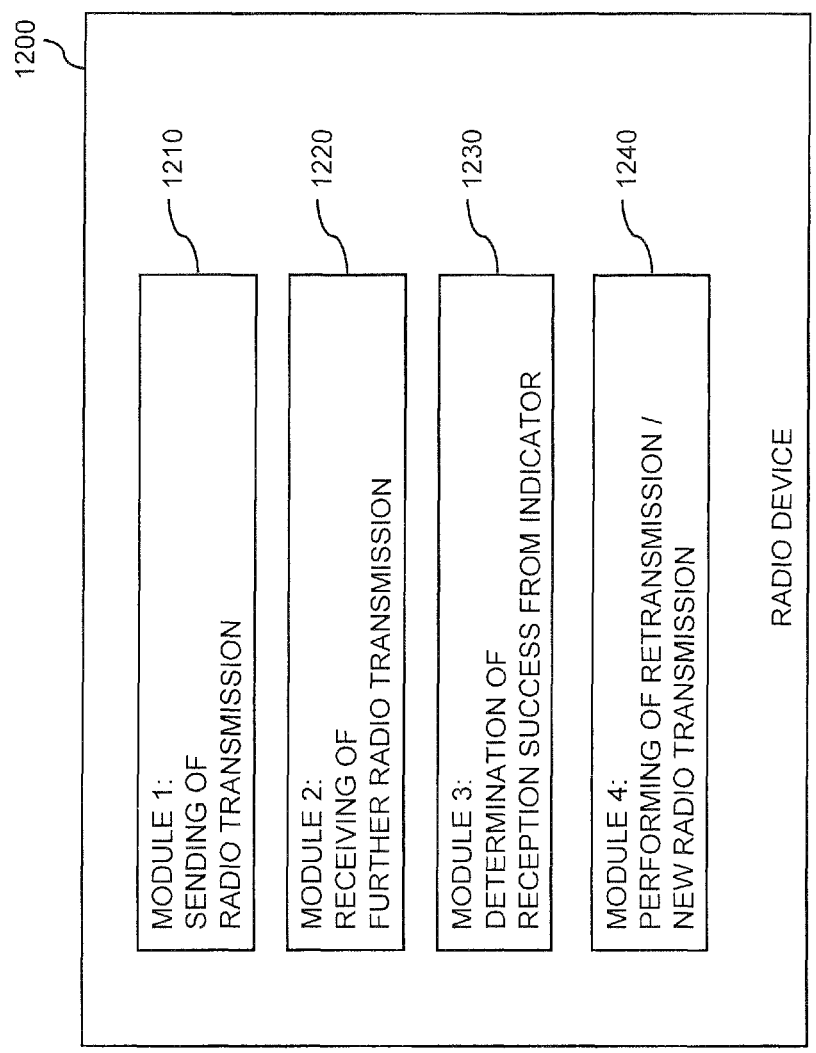
FIG. 12 shows a block diagram for illustrating functionalities of a sending radio device according to an embodiment of the invention.

FIG. 12 shows a block diagram for illustrating functionalities of a radio device 1200 which operates according to the method of FIG. 11. As illustrated, the radio device 1200 may be provided with a module 1210 configured to send a radio transmission to a further radio device, such as explained in connection with step 1110. Further, the radio device 1200 may be provided with a module 1220 configured to receive a further radio transmission from the further radio device, the further radio transmission including an indicator of reception success, such as explained in connection with step 1120. Further, the radio device 1200 may be provided with a module 1230 configured to determine, depending on the indicator of reception success, whether the radio transmission was successfully received by the further radio device or the radio transmission failed, such as explained in connection with step 1130. Further, the radio device 1200 may be provided with a module 1240 configured to perform, depending on the determination whether the radio transmission was successfully received or not, a retransmission of the radio transmission or a new radio transmission to the further radio device, such as explained in connection with step 1140.

It is noted that the radio device 1200 may also include further modules for implementing other functionalities as described above, such as functionalities for implementing a HARQ process or an ARQ process or functionalities for processing data according to different protocol layers. Further, it should be understood that the modules of the radio device 1200 do not necessarily represent a hardware structure of the radio device 1200, but may also correspond to functional elements, e.g., implemented by hardware, software, or a combination thereof.

Figure 13:
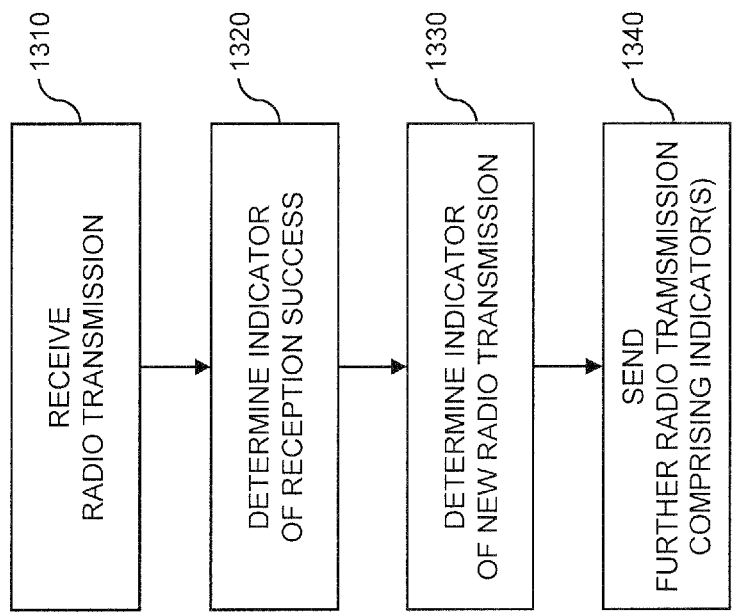
FIG. 13 shows a flowchart for illustrating a further method according to an embodiment of the invention, which may be implemented by a receiving radio device.

FIG. 13 shows a flowchart for illustrating a method which may be utilized for implementing the illustrated concepts in a radio device which acts as a receiver of a radio transmission, e.g., in a base station of a cellular radio network receiving an uplink radio transmission from a terminal device, such as the eNB 150. If a processor-based implementation of the radio device is used, the steps of the method may be performed by one or more processors of the radio device. In such a case the radio device may further comprise a memory for storing program code which, when executed by the processor(s), causes the radio device to perform the steps of the method.

At step 1310, the radio device may receive a radio transmission from a further radio device. If the radio device corresponds to a base station of a cellular radio network, the further radio device may correspond to a terminal device connected to the cellular radio network, such as the UE 100.

The radio transmission may for example correspond to transmission of a TB of the LTE radio technology or another cellular radio technology, e.g., a TB as sent on the PHY layer and including a MAC PDU. Examples of such radio transmission received by the radio device are the radio transmissions 403 and 407 of FIG. 4, the radio transmissions 503, 507, and 511 of FIG. 5, the radio transmissions 603, 607, 611, and 615 of FIG. 6, the radio transmissions 803, 807, 811, and 821 of FIG. 8, the radio transmissions 903 and 916 of FIG. 9, and the radio transmissions 1003, 1007, and 1017 of FIG. 10.

At step 1320, the radio device determines an indicator of reception success. The indicator of reception success may be represented by a single bit. The indicator of reception success may for example correspond to the above-mentioned RSI. Specifically, the radio device sets the indicator of reception success to one of a first state and a second state. Only in response to successfully receiving the radio transmission at step 1310, the radio device toggles the indicator to the other one of the first state and the second state. This toggling of the indicator may be performed by a MAC entity of the radio device, such as the MAC entity 170 of FIG. 1.

At step 1330, the radio device may determine a further indicator of a new radio transmission. The further indicator may for example correspond to the above-mentioned NDI. The further indicator is toggled in order to indicate to the further radio device whether the further radio device shall perform a new radio transmission to the radio device or a retransmission of the radio transmission. Specifically, in response to determining that the further radio device shall perform a new radio transmission to the radio device, the radio device toggles the further indicator with respect to a previous state of the further indicator. In response to determining that the further radio device shall perform a retransmission of the radio transmission, the radio device does not toggle the further indicator with respect to the previous state of the further indicator. Here, the previous state of the further indicator may be defined by the state of the further indicator as indicated in a radio transmission last transmitted to the further radio device. If the radio transmission is based on the LTE radio technology, such last radio transmission may correspond to the last uplink grant transmitted for the same HARQ process as the radio transmission. However, in some scenarios the previous state of the further indicator could also correspond to a well-defined initial state. Such initial state may for example be preconfigured in the radio device and the further radio device.

At step 1340, the radio device sends a further radio transmission including the indicator to the further radio device. In some scenarios, the further radio transmission also includes the further indicator optionally determined at step 1330. If the radio device corresponds to a terminal device connected to a cellular radio network and the further radio device corresponds to a base station of the cellular radio network, the further radio transmission may include an uplink grant indicating uplink radio resources allocated to the radio device. The further radio transmission may be protected by a CRC code and may be transmitted on a physical control channel, such as the PDCCH of the LTE radio technology, e.g., in DCI transmitted on the PDCCH. Examples of such further radio transmission are the uplink grant 405 of FIG. 4, the uplink grants 505 and 509 of FIG. 5, the uplink grants 605, 609, and 613 of FIG. 6, the uplink grants 805, 809, and 819 of FIG. 8, the uplink grant 914 of FIG. 9, and the uplink grants 1005 and 1015 of FIG. 10.

Figure 14:
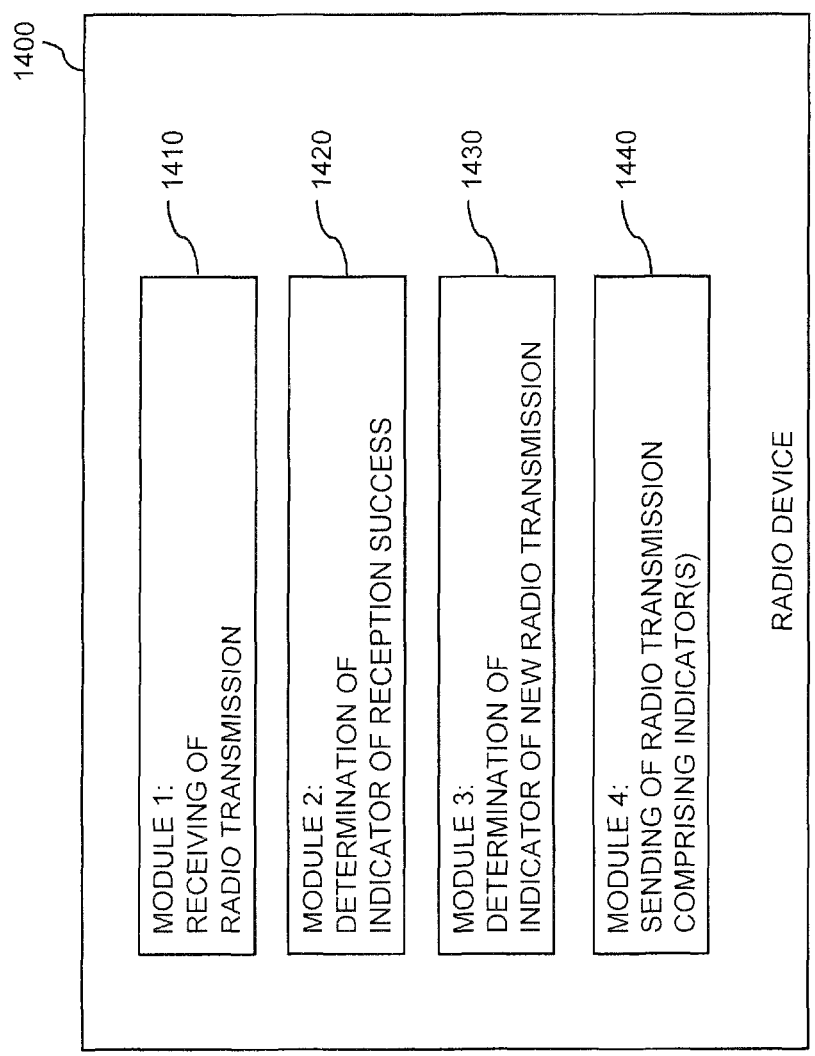
FIG. 14 shows a block diagram for illustrating functionalities of a receiving radio device according to an embodiment of the invention.

FIG. 14 shows a block diagram for illustrating functionalities of a radio device 1400 which operates according to the method of FIG. 13. As illustrated, the radio device 1400 may be provided with a module 1410 configured to receive a radio transmission from a further radio device, such as explained in connection with step 1310. Further, the radio device 1400 may be provided with a module 1420 configured to determine an indicator of reception success, such as explained in connection with step 1320. Further, the radio device 1400 may be provided with a module 1430 configured to determine a further indicator of a new radio transmission, such as explained in connection with step 1330. Further, the radio device 1400 may be provided with a module 1440 configured to perform, a further radio transmission to the further radio device, including the indicator of reception success and optionally the indicator of a new radio transmission, such as explained in connection with step 1340.

It is noted that the radio device 1400 may also include further modules for implementing other functionalities as described above, such as functionalities for implementing a HARQ process or an ARQ process or functionalities for processing data according to different protocol layers. Further, it should be understood that the modules of the radio device 1400 do not necessarily represent a hardware structure of the radio device 1400, but may also correspond to functional elements, e.g., implemented by hardware, software, or a combination thereof.

It is to be understood that the method of FIG. 11 and the method of FIG. 13 may also be combined in a system which includes a first radio device operating according to the method of FIG. 11 and a second radio device operating according to the method of FIG. 13. In such a system the first radio device would send the radio transmission to the second radio device and receive the further radio transmission including the indicator of reception success from the second radio device.

Figure 15:
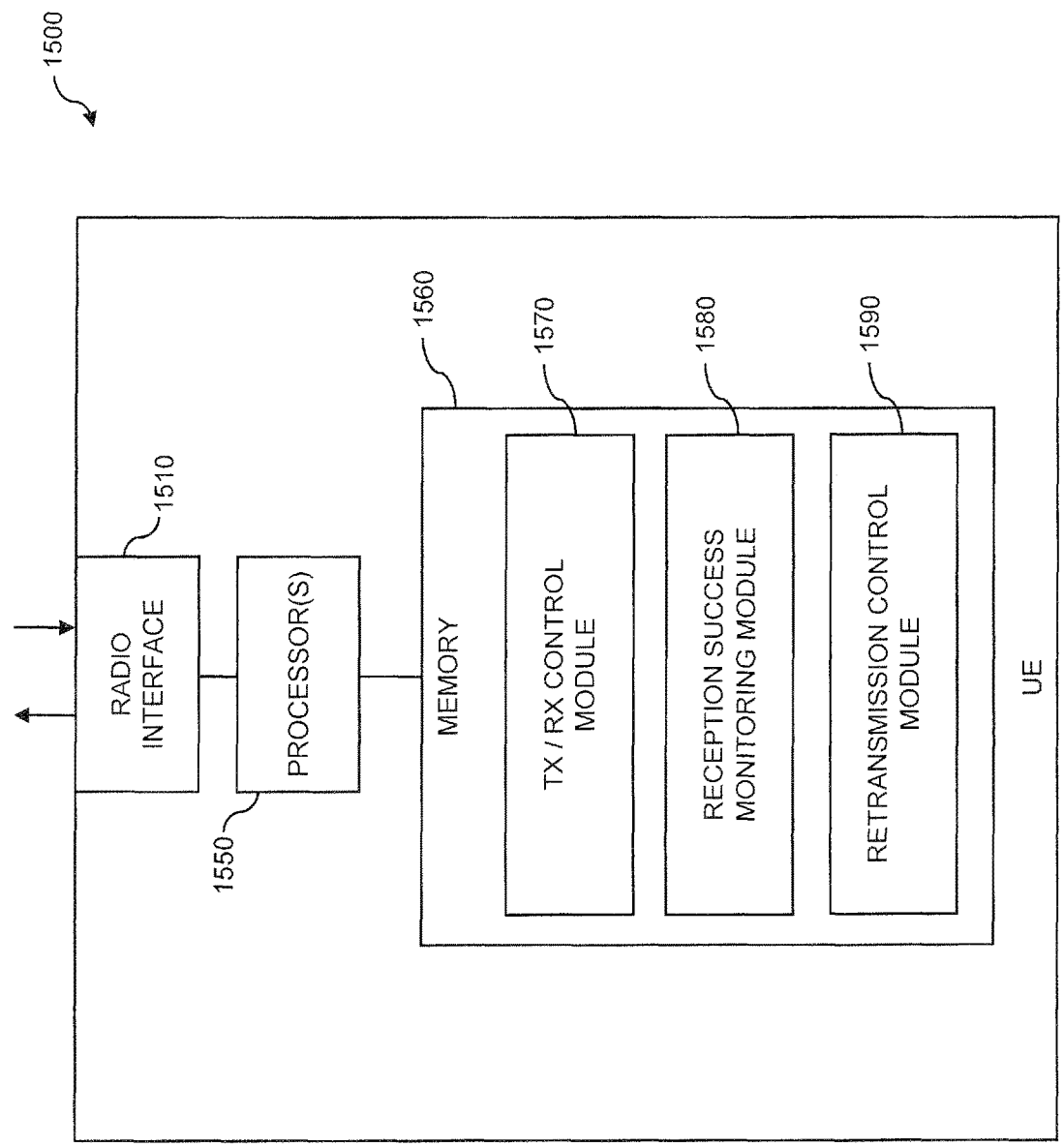
FIG. 15 schematically illustrates structures of a UE according to an embodiment of the invention.

FIG. 15 illustrates exemplary structures which may be used for implementing the above concepts in a radio device, which is assumed to be a terminal device 1500. The terminal device 1500 may for example correspond to the UE 100.

As illustrated, the terminal device 1500 may include a radio interface 1510 for sending and receiving radio transmissions. The radio interface 1510 may for example be used for connecting the terminal device 1500 to a cellular radio network, in particular to a base station of the cellular radio network, such as the eNB 150.

Further, the terminal device 1500 may include one or more processors 1550 coupled to the radio interface 1510, and a memory 1560 coupled to the processor(s) 1550. The memory 1560 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1560 includes suitably configured program code to be executed by the processor(s) 1550 so as to implement the above-described functionalities of a radio device. In particular, the memory 1560 may include various program code modules for causing the terminal device 1500 to perform processes as described above, e.g., corresponding to the processes of FIG. 3 and/or to the method steps of FIG. 11.

As illustrated, the memory 1560 may include a TX/RX control module 1570 for implementing the above-described functionalities of sending and receiving radio transmissions, e.g., as explained in connection with steps 1110, 1120, and 1140 of FIG. 11. Further, the memory 1560 may also include a reception success monitoring module 1580 for implementing the above-described functionalities of determining whether a radio transmission was successfully received or not, such as explained in connection with step 1130 of FIG. 11. Further, the memory 1560 may include a retransmission control module 1590 for implementing the above-described functionalities of controlling whether to perform a retransmission or a new radio transmission, such as explained in connection with step 1140 of FIG. 11.

It is to be understood that the structures as illustrated in FIG. 15 are merely schematic and that the terminal device 1500 may actually include further components which, for the sake of clarity, have not been illustrated, e.g., further interfaces or processors. Also, it is to be understood that the memory 1560 may include further types of program code modules, which have not been illustrated, e.g., program code modules for implementing known functionalities of a UE. According to some embodiments, also a computer program may be provided for implementing functionalities of the terminal device 1500, e.g., in the form of a physical medium storing the program code and/or other data to be stored in the memory 1560 or by making the program code available for download or by streaming.

Figure 16:
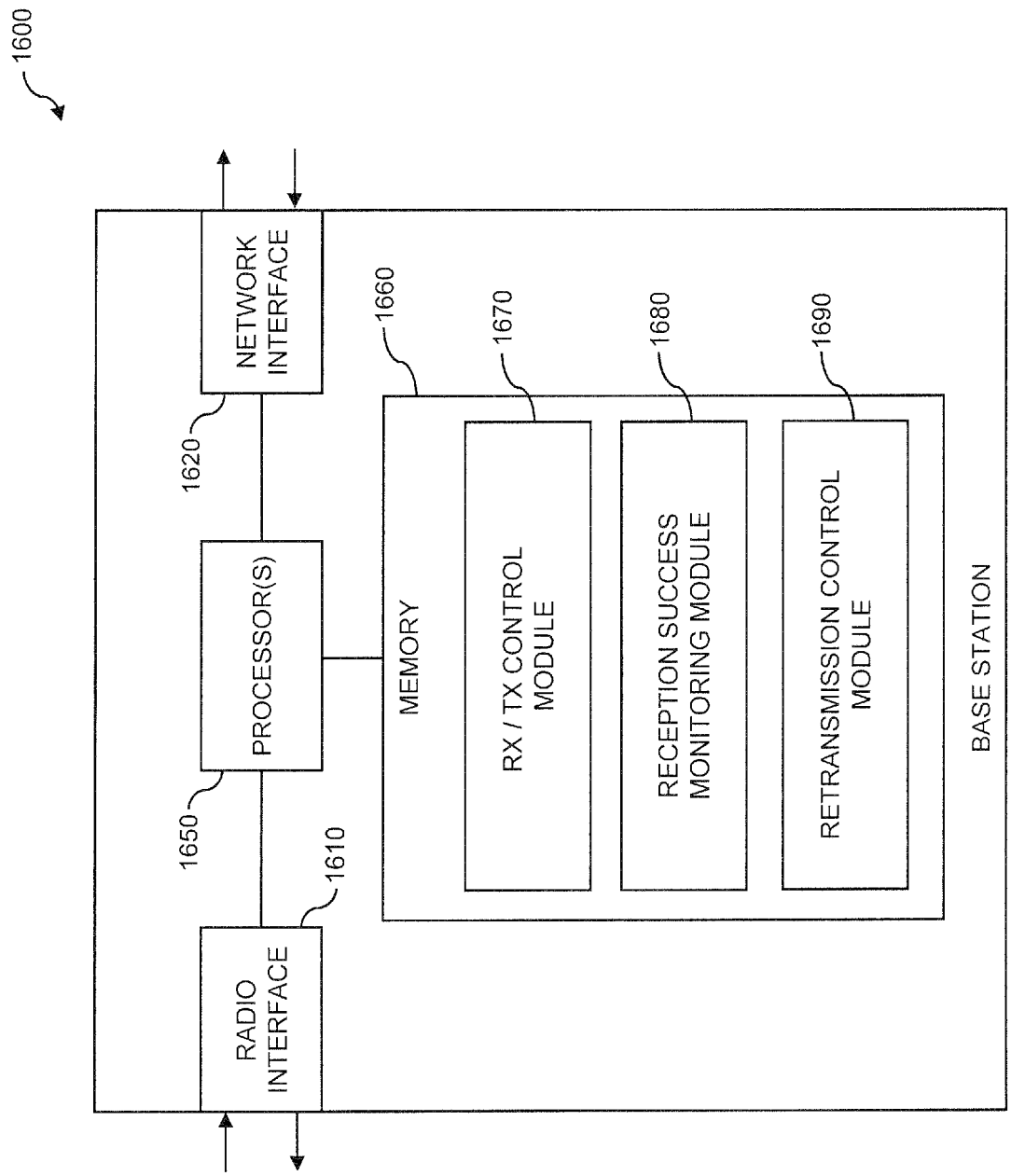
FIG. 16 schematically illustrates structures of a base station according to an embodiment of the invention.

FIG. 16 illustrates exemplary structures which may be used for implementing the above concepts in a radio device which is assumed to be a base station 1600 of a cellular radio network. The base station 1600 may for example correspond to the eNB 150.

As illustrated, the base station 1600 may include a radio interface 1610 for sending and receiving radio transmissions. The radio interface 1610 may for example be used for connecting one or more terminal devices, such as the UE 100, to the cellular radio network. Further, the base station 1600 may include a network interface 1620. The network interface may for example be used for connecting the base station 1600 to a core network part of the cellular radio network or to other nodes of a radio access network part of the cellular radio network.

Further, the base station 1600 may include one or more processors 1650 coupled to the interfaces 1610, 1620 and a memory 1660 coupled to the processor(s) 1650. The memory 1060 may include a ROM, e.g., a flash ROM, a RAM, e.g., a DRAM or SRAM, a mass storage, e.g., a hard disk or solid state disk, or the like. The memory 1660 includes suitably configured program code to be executed by the processor(s) 1650 so as to implement the above-described functionalities of a radio device. In particular, the memory 1660 may include various program code modules for causing the base station 1600 to perform processes as described above, e.g., corresponding to the processes of FIG. 2 and/or to the method steps of FIG. 13.

As illustrated, the memory 1660 may include a TX/RX control module 1670 for implementing the above-described functionalities of sending and receiving radio transmissions, e.g., as explained in connection with steps 1310 and 1340 of FIG. 13. Further, the memory 1660 may also include a reception success monitoring module 1680 for implementing the above-described functionalities of determining whether a radio transmission was successfully received or not, such as explained in connection with step 1320 of FIG. 13. Further, the memory 1660 may include a retransmission control module 1690 for implementing the above-described functionalities of controlling whether to perform a retransmission or a new radio transmission, such as explained in connection with step 1330 of FIG. 13.

It is to be understood that the structures as illustrated in FIG. 16 are merely schematic and that the base station 1600 may actually include further components which, for the sake of clarity, have not been illustrated, e.g., further interfaces or processors. Also, it is to be understood that the memory 1660 may include further types of program code modules, which have not been illustrated, e.g., program code modules for implementing known functionalities of a base station. According to some embodiments, also a computer program may be provided for implementing functionalities of the base station 1600, e.g., in the form of a physical medium storing the program code and/or other data to be stored in the memory 1660 or by making the program code available for download or by streaming.

As can be seen, the concepts as described above may be used for efficiently controlling radio transmissions. Specifically, on the basis of the toggling based indicator, it can be reliably determined whether the radio transmission was successfully received or not. This for example allows for using local feedback between different protocol layers of the radio device acting as the sender of the radio transmission. In this way, transmission efficiency may be increased by enhanced cooperation of different protocol layers, such as different protocol layers each providing a retransmit functionality. As can be seen from the examples described above, such enhanced cooperation may for example be achieved between the RLC layer (supporting ARQ retransmissions) and the MAC layer (supporting HARQ retransmissions) of the LTE radio technology.

It is to be understood that the examples and embodiments as explained above are merely illustrative and susceptible to various modifications. For example, the illustrated concepts may be applied in connection with various radio technologies. Further, the illustrated concepts may be applied in connection with various kinds of retransmission protocols. Moreover, it is to be understood that the above concepts may be implemented by using correspondingly designed software to be executed by one or more processors of an existing device, or by using dedicated device hardware.

The invention claimed is:

1. A method of controlling radio transmissions, the method comprising:
 a radio device sending a radio transmission to a further radio device;
 the radio device receiving a further radio transmission from the further radio device, the further radio transmission comprising an indicator of reception success;
 the radio device detecting whether the received indicator is toggled with respect to a stored previous state of the received indicator, based on a comparison of a present state of the received indicator with the stored previous state of the received indicator;
 in response to detecting that the received indicator is toggled with respect to the stored previous state of the indicator, the radio device determining that the radio transmission was successfully received by the further radio device; and
 in response to detecting that the received indicator is not toggled with respect to the stored previous state of the indicator, the radio device determining that the radio transmission failed,
 wherein the determination whether the radio transmission was successfully received by the further radio device or the radio transmission failed is performed by a Medium Access Control entity of the radio device and a result of the determination is indicated by the Medium Access Control entity to a higher layer entity of the radio device.

2. The method of claim 1, the method further comprising at least one of the following:
 depending on the indicated result of the determination, the higher layer entity initiating a retransmission;

depending on the indicated result of the determination, the higher layer entity controlling buffering of data for retransmission;

depending on a result of the determination whether the radio transmission was successfully received by the further radio device or the radio transmission failed, the radio device sending control information to the further radio device; and depending on a result of the determination whether the radio transmission was successfully received by the further radio device or the radio transmission failed, the radio device sending a report to the further radio device.

3. The method of claim 1, wherein the further radio transmission comprises a further indicator of a new radio transmission, and wherein the method further comprises:

in response to the further indicator being toggled with respect to a previous state of the further indicator, the radio device performing the new radio transmission to the further radio device; and in response to the further indicator not being toggled with respect to the previous state of the further indicator, the radio device performing a retransmission of the radio transmission.

4. The method of claim 1, wherein the further radio transmission is protected by a Cyclic Redundancy Check code.

5. The method of claim 1, wherein the radio device is a terminal device connected to a cellular radio network and the further radio device is a base station of the cellular radio network; and wherein the further radio transmission comprises an uplink grant indicating uplink radio resources allocated to the radio device.

6. A method of controlling radio transmissions, the method comprising:

a radio device setting an indicator of reception success to one of a first state and a second state;

in response to successfully receiving a radio transmission from a further radio device, the radio device toggling the indicator to the other one of the first state and the second state, wherein the radio device toggling the indicator to the other one of the first state and the second state using a Medium Access Control entity;

the radio device setting a further indicator of the reception success to one of the first state and the second state; and the radio device sending a further radio transmission comprising the indicator and the further indicator to the further radio device.

7. The method of claim 6, wherein the further indicator is for a new radio transmission, and wherein the method further comprises:

in response to determining that the further radio device shall perform the new radio transmission to the radio device, the radio device toggling the further indicator to the other one of the first state and the second state of the further indicator; and in response to determining that the further radio device shall perform a retransmission of the radio transmission, the radio device not toggling the further indicator to the other one of the first state and the second state of the further indicator.

8. The method of claim 6, wherein the further radio transmission is protected by a Cyclic Redundancy Check code.

9. The method of claim 6, wherein the indicator is represented by a single bit.

10. The method of claim 6, wherein the radio device is a base station of a cellular radio network and the further radio device is a terminal device connected to the cellular radio network; and wherein the further radio transmission comprises an uplink grant indicating uplink radio resources allocated to the further radio device.

11. A radio device, the radio device comprising a processor and a memory operatively connected to the processor, the memory comprising program instructions for execution by the processor whereby the radio device is configured to:

send a radio transmission to a further radio device;

receive a further radio transmission from the further radio device, the further radio transmission comprising an indicator of reception success;

detect whether the received indicator is toggled with respect to a stored previous state of the received indicator, based on a comparison of a present state of the received indicator with the stored previous state of the received indicator;

in response to a detection of the received indicator being toggled with respect to the stored previous state of the indicator, determine that the radio transmission was successfully received by the further radio device; and in response to a detection of the received indicator not being toggled with respect to the stored previous state of the indicator, determine that the radio transmission failed, wherein the radio device comprises a Medium Access Control entity which is configured to perform the determination whether the radio transmission was successfully received by the further radio device or the radio transmission failed and to indicate a result of the determination to a higher layer entity of the radio device; and wherein the higher layer entity is configured to, depending on the indicated result of the determination, initiate a retransmission or control buffering of data for retransmission, or both.

12. The radio device of claim 11, wherein the further radio transmission comprises a further indicator of a new radio transmission, and wherein the radio device is further configured to:

in response to the further indicator being toggled with respect to a previous state of the further indicator, perform the new radio transmission to the further radio device; and in response to the further indicator not being toggled with respect to the previous state of the further indicator, perform a retransmission of the radio transmission.

13. The radio device of claim 11, wherein the radio device is a terminal device connected to a cellular radio network and the further radio device is a base station of the cellular radio network; and wherein the further radio transmission comprises an uplink grant indicating uplink radio resources allocated to the further radio device.

14. A radio device, the radio device comprising a processor and a memory operatively connected to the processor, the memory comprising program instructions for execution by the processor whereby the radio device is configured to:

set an indicator of reception success to one of a first state and a second state;

in response to a successful reception of a radio transmission from a further radio device, toggle the indicator to the other one of the first state and the second state, wherein the radio device comprises a Medium Access Control entity configured to perform the toggling of the indicator;

set a further indicator of the reception success to one of the first state and the second state; and send a further radio transmission comprising the indicator and the further indicator to the further radio device.

15. The radio device of claim 14, wherein the further indicator is for a new radio transmission, and wherein the radio device is further configured to:

in response to a determination that the further radio device shall perform the new radio transmission to the radio device, toggle the further indicator to the other one of the first state and the second state of the further indicator; and in response to a determination that the further radio device shall perform a retransmission of the radio transmission, not toggle the further indicator to the other one of the first state and the second state of the further indicator.

16. The radio device of claim 14, wherein the radio device is a base station of a cellular radio network and the further radio device is a terminal device connected to the cellular radio network.

17. The radio device of claim 16, wherein the further radio transmission comprises an uplink grant indicating uplink radio resources allocated to the further radio device.

* * * * *